(12) United States Patent
Moriuchi et al.

(10) Patent No.: US 7,308,080 B1
(45) Date of Patent: Dec. 11, 2007

(54) VOICE COMMUNICATIONS METHOD, VOICE COMMUNICATIONS SYSTEM AND RECORDING MEDIUM THEREFOR

(75) Inventors: Machio Moriuchi, Yokohama (JP); Yasuyuki Kiyosue, Yokosuka (JP); Syunsuke Konagai, Yokohama (JP); Shigeki Masaki, Yokohama (JP)

(73) Assignee: Nippon Telegraph and Telephone Corporation, Chiyoda-Ku, Tokyo (JP)

( * ) Notice: Subject to any disclaimer, the term of this patent is extended or adjusted under 35 U.S.C. 154(b) by 986 days.

(21) Appl. No.: 09/610,613

(22) Filed: Jul. 5, 2000

(30) Foreign Application Priority Data

| Jul. 6, 1999 | (JP) | ............................... 11-192012 |
| Jul. 19, 1999 | (JP) | ............................... 11-204533 |
| Apr. 19, 2000 | (JP) | ............................... 2000-118599 |

(51) Int. Cl.
*H04M 1/64* (2006.01)

(52) U.S. Cl. ............................... 379/88.04; 379/88.17; 704/275

(58) Field of Classification Search ............... 704/257, 704/270.1, 275; 434/350, 352, 362, 322, 434/323; 379/67.1, 88.04, 88.17
See application file for complete search history.

(56) References Cited

U.S. PATENT DOCUMENTS

| 5,157,660 A | * | 10/1992 | Kuwahara et al. | .......... 370/314 |
| 5,537,141 A | * | 7/1996 | Harper et al. | ................ 725/116 |
| 5,729,532 A | * | 3/1998 | Bales et al. | .................. 370/261 |
| 5,960,005 A | * | 9/1999 | Moteki et al. | .............. 370/496 |
| 6,392,993 B1 | * | 5/2002 | Hamilton et al. | ........... 370/230 |

FOREIGN PATENT DOCUMENTS

| JP | 4-249938 | 9/1992 |
| JP | 7-202887 | 8/1994 |
| JP | 7-105106 | 4/1995 |
| JP | 9-152894 | 6/1997 |
| JP | 11-46194 | 2/1999 |

OTHER PUBLICATIONS

Konagai, et al., "An Audio Communication Method in Multiuser Virtual Space", Technical Report of IEICE, pp. 61-66, vol. 99, No. 647, Feb. 21, 2000 (English abstract included on p. 61).
Benedikt, et al., "Cyberspace, First Steps", Chapter 10, pp. 282-307, 1994 (English language version enclosed).

* cited by examiner

*Primary Examiner*—Gauthier Gerald
(74) *Attorney, Agent, or Firm*—Thelen Reid Brown Raysman & Steiner LLP

(57) ABSTRACT

The objective of the present invention is to enable a speaker to visually confirm whether or not his voice has reached a listener. In order to achieve this objective, in the present invention, the listener terminal generates a reception result for voice data, and the talker terminal displays the reception state based on this reception result.

It is a further objective of the present invention to enable conversational timing to be achieved easily. In order to achieve this objective, in the present invention, the talker terminal sends utterance data prior to sending voice data, this utterance data being shorter than the voice data. The listener terminal displays the talker terminal's utterance based on this utterance data.

Another objective of the present invention is to deliver voice data from the talker terminal to a particular listener terminal only, without having to form a private group. In order to achieve this objective, in the present invention, the server stores permission or denial for sending data from an optional terminal to another optional terminal, and distributes the voice data based on this storage.

39 Claims, 14 Drawing Sheets

FIG. 8
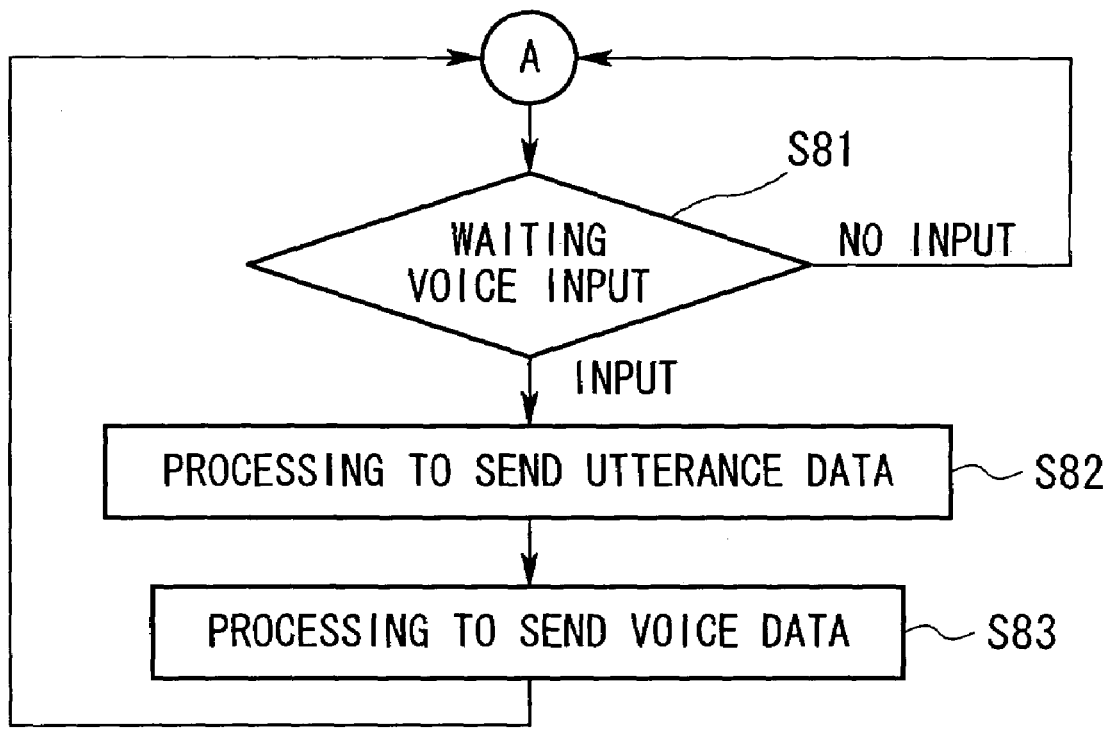
FIG. 10A    FIG. 10B    FIG. 10C
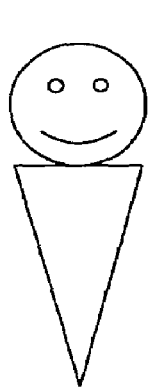  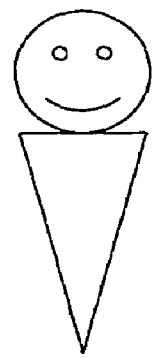

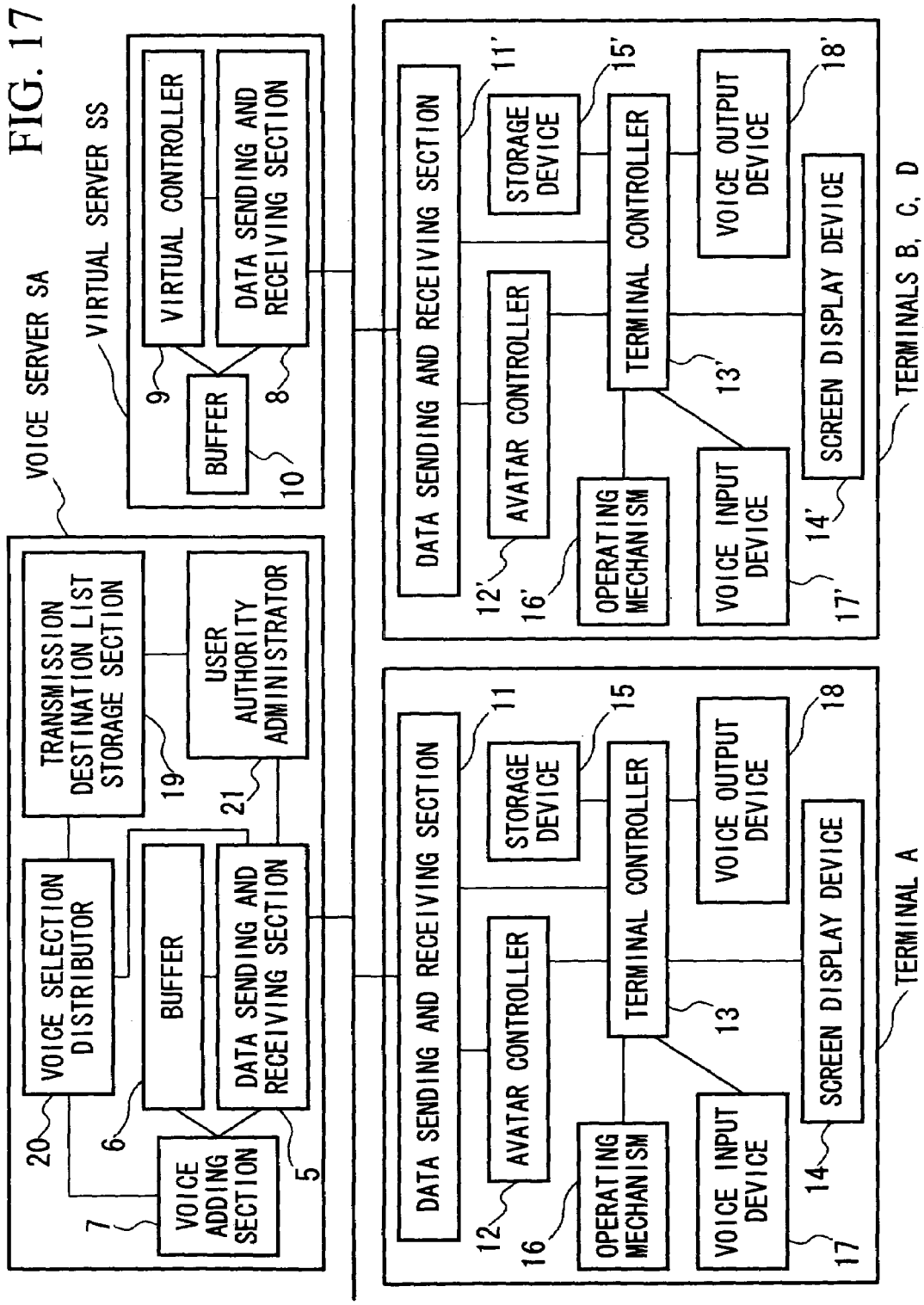

VOICE COMMUNICATIONS METHOD, VOICE COMMUNICATIONS SYSTEM AND RECORDING MEDIUM THEREFOR

BACKGROUND OF THE INVENTION

1. Field of the Invention

The present invention is related to a voice communications method, a voice communications system, and a recording medium for recording the programs therefore, that are used in a network system in which there are a plurality of connected terminals for carrying out conversation between the users of these terminals.

This specification is based on patent applications previously filed in Japan (Japanese Patent Application Hei 11-192012, Japanese Patent Application Hei 11-204533, and Japanese Patent Application 2000-118599), these applications being incorporated within this specification as a portion thereof.

2. Description of the Related Art

In a network system having a plurality of connected terminals, the server provides a number of virtual spaces that can be accessed through these terminals. When multiple terminals access the same virtual space, the users of these terminals are displayed by a specific display form (hereinafter referred to as an "avatar") within the virtual space that is being displayed on each terminal's screen display device. When multiple terminal users converse with one another in the network system described above, the data sent from the terminal of the user who is talking (hereinafter, referred to as the "talker terminal") is first received at the server. The server mixes data received from multiple terminals, and then sends the mixed data to the terminals (hereinafter, referred to as "listener terminals") which are accessing the same virtual space as the talker terminal.

In the above-described network system, a number of methods are used to clarify who the talker is. For example, in the case of a character chat for sending and receiving character data, the characters indicated by the character data are displayed on the talker's avatar. Alternatively, the talker's name and the aforementioned characters may be displayed together in a display column (a window, etc.) that is separate from the virtual space. On the other hand, in the case of a voice chat for sending and receiving voice data, the talker's avatar display changes as the voice is being output. For example, a specific mark (a ripple, etc.) can be applied to the talker's avatar, or the lips of the talker's avatar may move. The technology for displaying an avatar in virtual space is disclosed in pages 282 to 307 of *CYBERSPACE*, Michael Benedikt, NTT Human Interface Laboratories, NTT Publications, ISBN 4-87188-265-9C0010.

Although conventional voice communications methods enable the talker to be identified, it has not been possible for the talker to know whether or not his voice has reached the listener. For this reason, each time he makes an utterance, the talker must verbally confirm that his voice has reached the listener by asking "can you hear me?," for example.

Moreover, in conventional voice communications methods, each terminal user recognizes that another party has begun to speak (hereinafter referred to as "utterance") as a result of the output of that party's voice. However, since voice data is comparatively large data, the arrival of voice data from the talker terminal at the listener terminal is slightly delayed. In addition, a slight delay in the arrival of voice data may arise due to variation in traffic and buffering in the above-described network system. In addition, as mentioned above, voice data sent from the talker terminal is not directly received at the listener terminal, but rather is first received at the server. This also results in a delay. Since the arrival of the data is slightly delayed in this way, good conversational timing has been difficult to achieve in conventional voice communications methods due to such problems as voice data from the other parties arriving just as the user begins to speak, or arriving immediately after the user has spoken, etc. For this reason, users must converse while anticipating this delay, making this arrangement quite inconvenient and burdensome to the user.

In addition, when a user of an avatar within a given virtual space wants to have a personal conversation (private talk) only with a user of a particular avatar that is in the same virtual space, then these users have had to form a private group for this purpose. Specifically, in the case where a given virtual space is being accessed by terminals A to D, and the user of terminal A wishes to converse only with the user of terminal B, then the terminal A user invites the terminal B user to participate in a private group. If the terminal B user agrees, then terminal A and terminal B form a private group which persists until it is dissolved by both users, in which the voice from terminal A reaches only terminal B and the voice from terminal B reaches only terminal A. During the time that the private group is present, however, neither of the participating users (i.e., the users of terminals A and B) can initiate conversation with nor hear voices from users that are not participating in the private group (i.e., the users of terminals C and D).

SUMMARY OF THE INVENTION

It is therefore the objective of the present invention to provide a voice communications method, a voice communications system, and a recording medium for recording the programs therefor, that enables a talker to visually confirm that his voice has reached his listener.

It is also the objective of the present invention to provide a voice communications method, a voice communications system, and a recording medium for recording the programs therefor, with which conversational timing can be easily achieved.

It is a further objective of the present invention to provide a voice communications method, a voice communications system, and a recording medium for recording the programs therefore, which enables voice data from the talker terminal to be delivered to a specific listener terminal only, without having to form a private group between the talker terminal and the listener terminal.

The present invention comprises a process at the terminal at which voice is input for generating voice data indicating said voice; a process at the server for receiving said voice data; a process at said server for sending said voice data to a predetermined terminal; a process at said predetermined terminal for receiving said voice data; a process at the terminal that received said voice data for outputting the voice indicated by said voice data; a process at the terminal that received said voice data for generating a reception result of said voice data; a process at the terminal that sent said voice data for receiving said reception result; and a process at the terminal that received said reception result for indicating the reception state of said voice data based on said reception result. As a result of these characteristics, the talker is able to visually confirm whether or not his voice has reached the listener.

The present invention is further characterized in that said process for indicating said reception state indicates said reception state by indicating the action of the avatar of the user of the terminal that received said voice data. As a result of this feature, it becomes easy for talker to distinguish from among the multiple avatars present in the virtual space between those avatars to whom talker's voice has reached and those to whom talker's voice has not reached. Thus, the talker can quickly know that a personal conversation intended for a specific user only (i.e., the user of an avatar that is present within the line of sight of talker's own avatar, and that is present within a specific distance from talker's own avatar) is reaching other users in the vicinity.

The present invention comprises a process at the terminal at which voice is input for generating utterance data, which is shorter than the voice data indicating said voice and which is data indicating an utterance; a process at the server for receiving said utterance data; a process at said server for sending said utterance data to a predetermined terminal; a process at said predetermined terminal for receiving said utterance data; a process at the terminal that received said utterance data for indicating the utterance by the terminal that sent said utterance data; a process at the terminal that sent said utterance data for generating said voice data; a process at said server for receiving said voice data; a process at said server for sending said voice data to said predetermined terminal; a process at said predetermined terminal for receiving said voice data; and a process at the terminal that received said voice data for outputting the voice indicated by said voice data. As a result of this feature, the listener is able to anticipate the arrival of voice data based on the utterance data, making it easy for the listener to achieve conversational timing with the talker.

The present invention comprises a process at the server for storing permission or denial for sending data from one optional terminal to another optional terminal; a process at the terminal at which voice is input for generating voice data indicating said voice; a process at said server for receiving said voice data; a process at said server for sending said voice data to terminal to which data is permitted to be sent from the terminal that sent said voice data; a process at the terminal to which data is permitted to be sent from the terminal that sent said voice data for receiving said voice data; and a process at the terminal that received said voice data for outputting the voice indicated by said voice data. As a result of this feature, it is possible for voice data from the talker terminal to reach a particular listener terminal only, without having to form a private group between the talker terminal and a specific listener terminal (i.e., without having to limit the sending and receiving parties for the listener terminals).

The present invention is further characterized in the provision of a process at a predetermined terminal for designating permission or denial for sending data from said predetermined terminal to another optional terminal; wherein said process for storing stores the designation. As a result of this feature, a specific user (a chairman or teacher for example) is given control to permit or deny conversation between other users during remote conferencing or remote teaching for example. In remote teaching for example, the teacher can forbid private conversations between students, or can divide the students into discussion groups.

The present invention is further characterized in the provision of a process at a predetermined terminal for designating permission or denial for sending data from one optional terminal to another optional terminal; and a process at said predetermined terminal for sending said designation to said server if the designation is within the authorized limits of said predetermined terminal, and discarding said designation if the designation is outside the authorized limits of said predetermined terminal; wherein said process for storing stores the designation sent by said predetermined terminal. As a result of this feature, the determination of whether or not the designation by a predetermined terminal is authorized is made by the predetermined terminal. Thus, the server does not need to make this designation, so that the load on the server is reduced.

BRIEF DESCRIPTION OF THE DRAWINGS

FIG. 8 is a flow chart showing an example of the processing at the talker terminal according to a second embodiment of the present invention.

FIG. 10 is an explanatory figure showing an example of the action of the avatar according to a second embodiment of the present invention.

FIG. 17 is a block diagram showing an example of the design of the network system in Example 2 according to a third embodiment of the present invention.

DESCRIPTION OF THE PREFERRED EMBODIMENTS

1. First Embodiment

The first embodiment of the present invention will now be explained in detail with reference to the accompanying figures.

Figure 1:
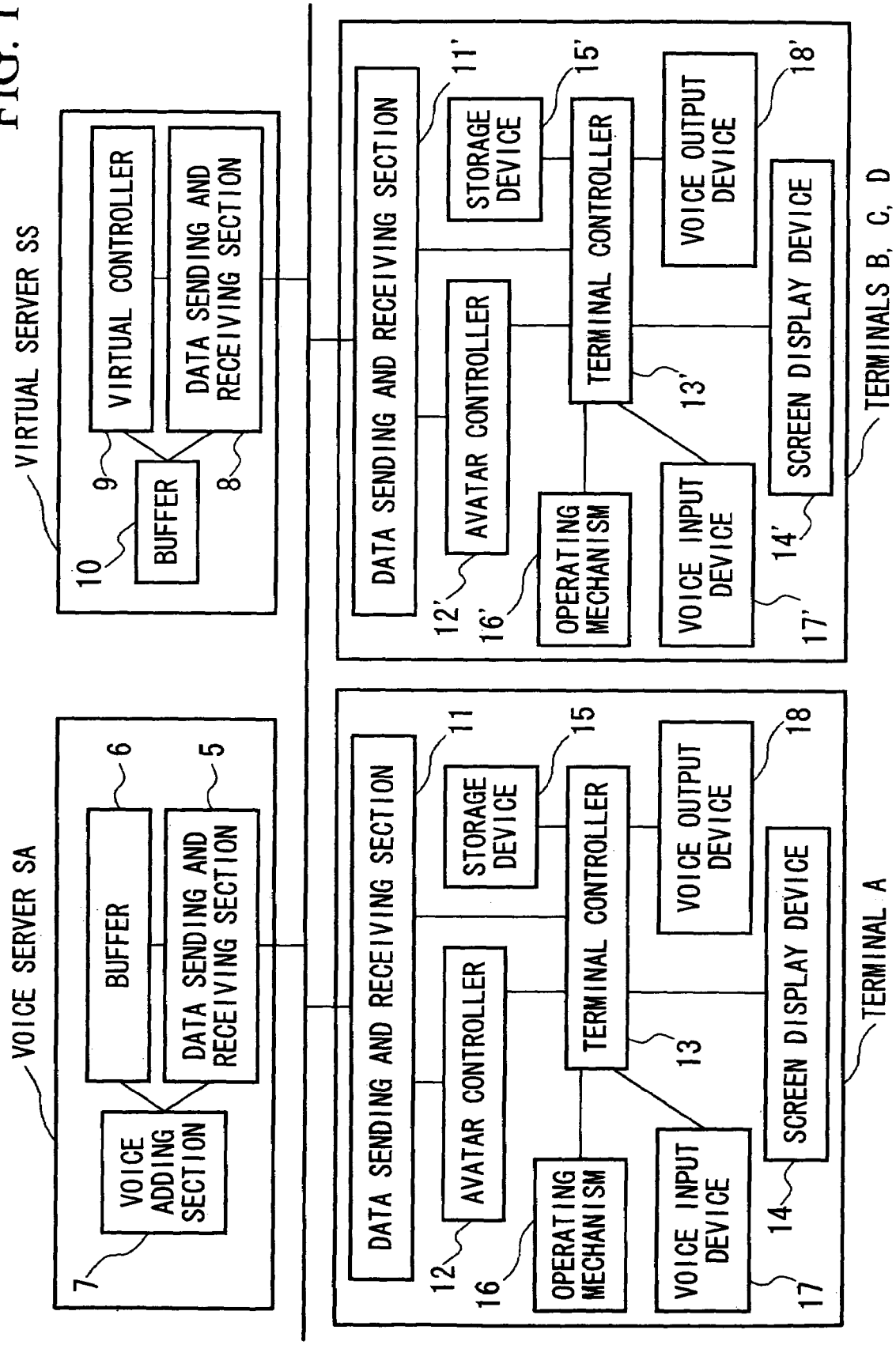
FIG. 1 is a block diagram showing an example of the design of a network system according to a first embodiment of the present invention.

FIG. 1 is a block diagram showing an example of the design of a network system according to this embodiment. This network system is composed of multiple terminals A to D, virtual server SS, and voice server SA. Note that the number of terminals in the network system is not limited to 4. Terminals A to D, virtual server SS, and voice server SA are connected together by communications circuits. Any type of communications circuit is acceptable, including a WAN (Wide Area Network), LAN (Local Area Network), or the Internet. Terminals A to D, virtual server SS, and voice server SA send and receive information in message form each other.

Terminals A to D, virtual server SS and voice server SA are formed of a computer device consisting of a CPU (central processing unit) and its peripheral circuits. This computer device functions as shown by each of the blocks of FIG. 1 under the control of specific programs recorded in a recording medium (i.e., magnetic disk, semiconductor memory, etc.).

A CRT display (or a liquid crystal display) may be cited as one example of the screen display devices 14,14' shown in FIG. 1, while a keyboard and mouse are examples of operating mechanisms 16,16', a mike is an example of voice input devices 17,17', and a speaker is an example of voice output devices 18,18'.

(1) Terminal Log-In

The terminal log-in process will now be explained using as an example the case where terminal A logs in to the network system and accesses the same virtual space as terminals B to D. Note that this is just one example, however, and that all of the terminals are of course capable of executing the same processing.

When the user switches on the power source for terminal A, terminal controller 13 for terminal A executes the start-up program in storage device 15, and then generates a log-in request message. This log-in request message at least includes the ID of the user at terminal A (hereinafter, referred to as "terminal A ID"), his password, and the name of the virtual space he wishes to access. Data sending and receiving section 11 sends the generated log-in request message to virtual server SS.

Data sending and receiving section 8 in virtual server SS receives the log-in request message from terminal A. Virtual controller 9 compares the ID and password that are included in the received log-in request message with a pre-stored ID and password. If the IDs and passwords match, then virtual controller 9 stores the log-in information, which consists of the user's ID, the virtual space name that is contained in the log-in request message containing this ID, and the IP of the terminal indicated by the ID, in an administrative table inside buffer 10. In addition, if there is a match, then virtual controller 9 generates a log-in permitted message for the terminal indicated by this ID (i.e., terminal A here). Data sending and receiving section 8 sends the thus generated log-in permitted message to terminal A.

At terminal A, data sending and receiving section 11 receives the log-in permitted message from virtual server SS. Based on the log-in permitted message that it receives, terminal controller 13 recognizes log-in permission for its terminal (i.e., terminal A). When terminal controller 13 recognizes the log-in permission, then the aforementioned virtual space is displayed on screen display device 14 based on a virtual space model prepared in storage device 15.

This concludes the terminal log-in process.

After the above-described log-in, if a log-out request message is received from terminal A, then virtual server SS removes the terminal A ID, virtual space name and IP from the administrative table. Similarly, after log-in, virtual server SS regularly sends a "check connection status" message to terminals A to D. If no answer is received within a specific period of time following transmission of this message, then the ID, virtual space name, and IP of the terminals that did not respond are eliminated from the administrative table.

Note that virtual controller 9 regularly obtains the IDs of all the terminals that are accessing the same virtual space based on the aforementioned administrative table. Data sending and receiving section 8 sends all of the thus-obtained IDs to each of the terminals indicated by these IDs. At each terminal, data sending and receiving section 11 (or 11') receives the ID from data sending and receiving section 8. Terminal controller 13 (or 13') displays the avatar of the user of the terminal indicated by the received ID on screen display device 14, based on avatar models prepared in storage device 15 (or 15').

(2) Avatar Update

The processing for updating an avatar will now be explained using as an example the case where the position and the direction of the line of sight (in virtual space) of the terminal A user's avatar are updated at terminal A, and, accompanying this, the position and the direction of the line of sight (in virtual space) of the terminal A user's avatar that is displayed on screen display device 14' of terminals B to D are updated. Note that this is just one example, however, and that all of the terminals are of course capable of executing the same processing.

Operating mechanism 16 is used at terminal A to input the position and the direction of the line of sight of the avatar. When the position and the direction of the line of sight are input, operating mechanism 16 generates data showing this position and line of sight direction (hereinafter, referred to as "avatar data"). Based on the avatar data generated, terminal controller 13 updates the position and the direction of the line of sight of the user's avatar at its terminal (i.e., terminal A) that is displayed on screen display device 14. Terminal controller 13 sends the generated avatar data to data sending and receiving section 11 along with the ID for its terminal (i.e., terminal A). Data sending and receiving section 11 sends this avatar data and ID to virtual server SS.

At virtual server SS, data sending and receiving section 8 receives the avatar data and ID from terminal A. Based on the administrative table in buffer 10, virtual controller 9 obtains the ID of the terminals (i.e., terminals B to D) which are accessing the same virtual space that is being accessed by the terminal indicated by the received ID (i.e., terminal A). Data sending and receiving section 8 sends the received avatar data and ID (i.e., the ID for terminal A) to the terminals indicated by the obtained IDs (i.e., terminals B to D).

Data sending and receiving sections 11' at terminals B to D receive the avatar data and ID (i.e., the ID for terminal A) from virtual server SS. Based on this received avatar data, terminal controllers 13' update the position and the direction of the line of sight for the terminal A user's avatar that is shown on screen display devices 14'.

This concludes the processing for updating an avatar.

(3) Sending and Receiving Voice Data

The processing for sending and receiving voice data in the present embodiment will now be explained using as an example the case in which terminal A sends voice data to terminals B to D. Note that this is just one example, however, and that all of the terminals are of course capable of executing the same processing.

Figure 2:
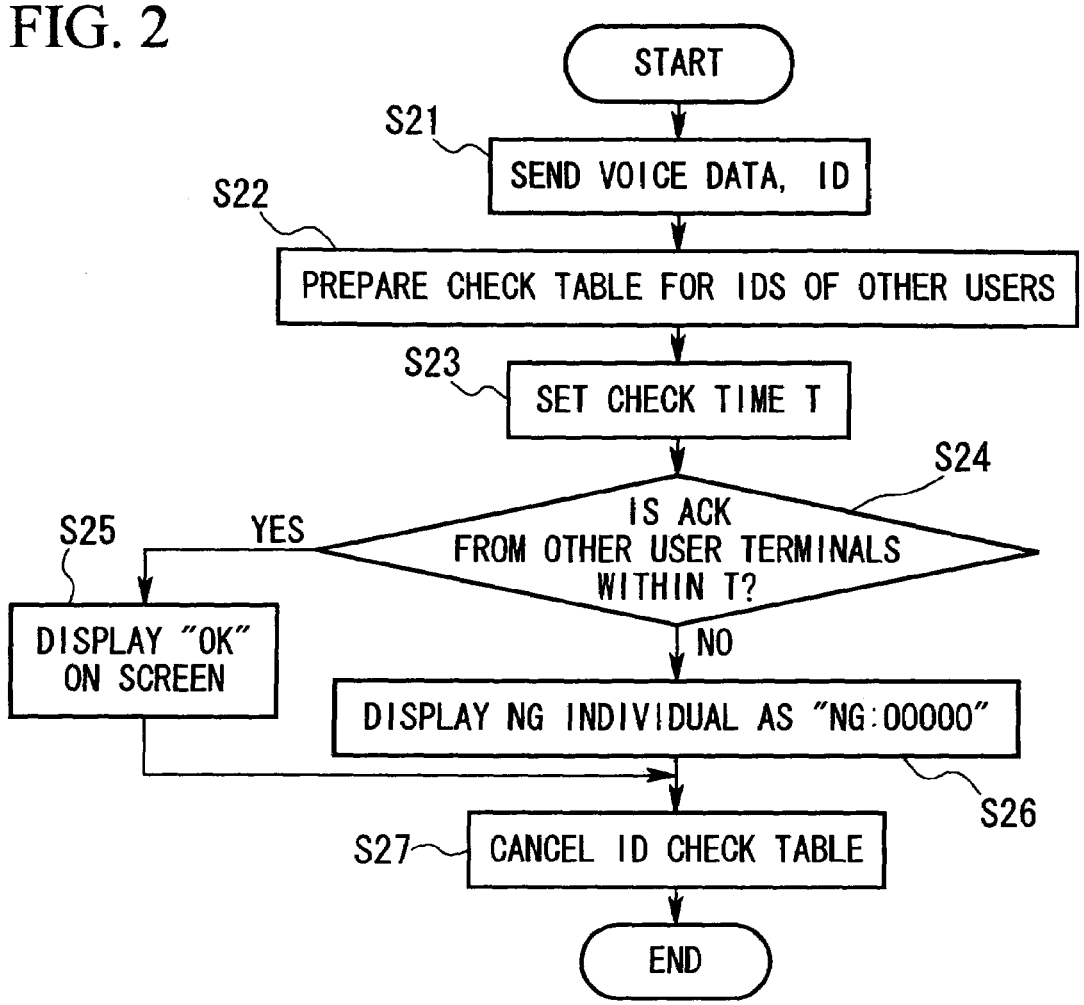
FIG. 2 is a flow chart showing an example of processing at the talker terminal according to a first embodiment of the present invention.
Figure 3:
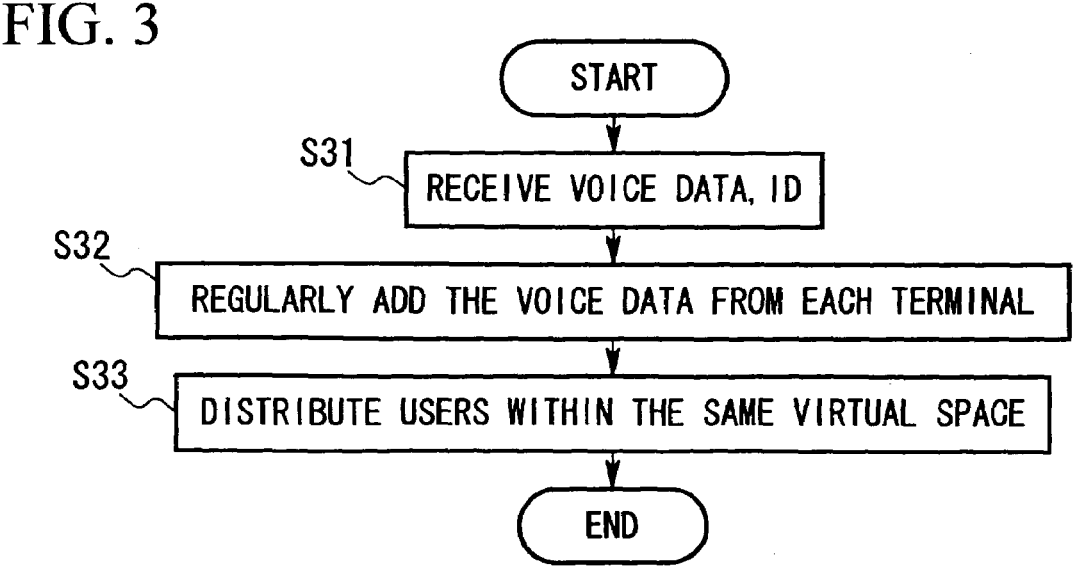
FIG. 3 is a flow chart showing an example of the processing at a voice server according to a first embodiment of the present invention.
Figure 4:
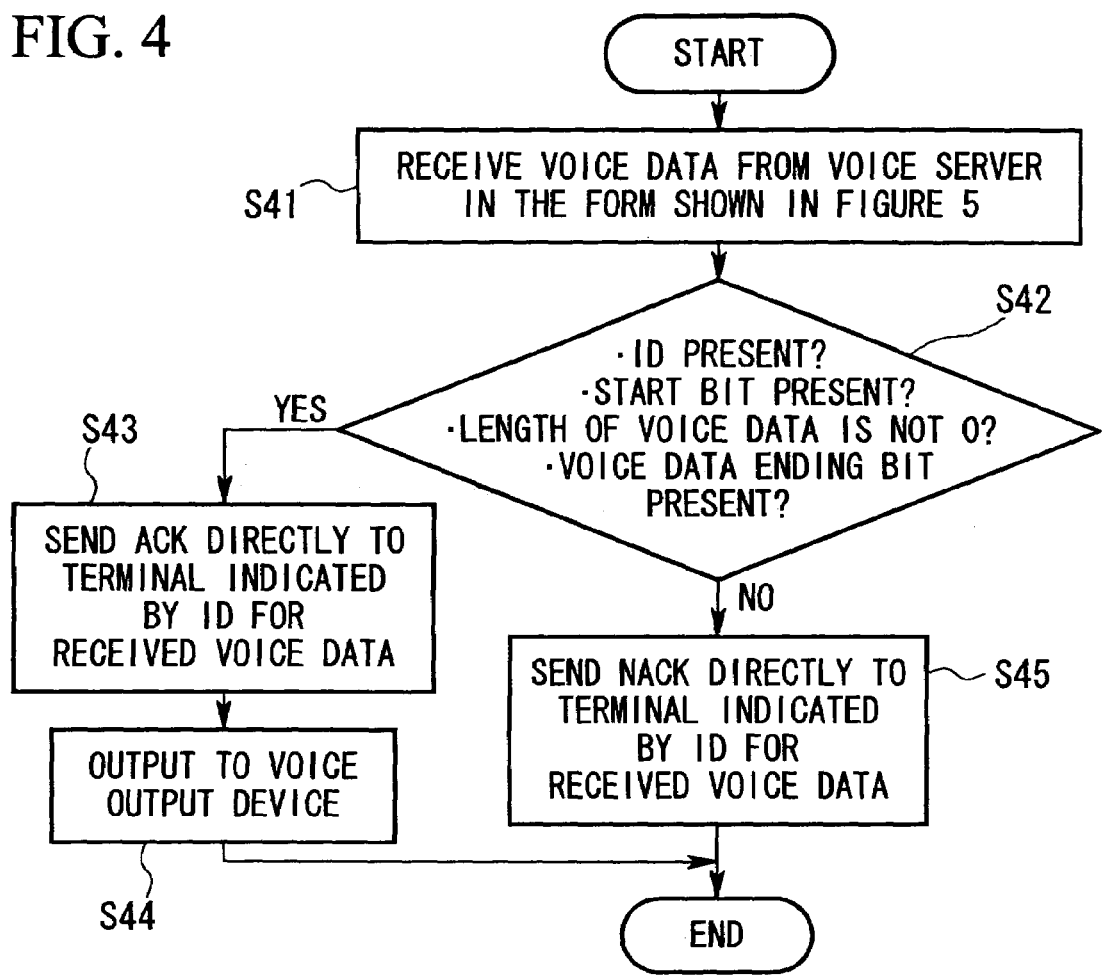
FIG. 4 is a flow chart showing an example of the processing at the listener terminal according to a first embodiment of the present invention.

FIG. 2 is a flow chart showing an example of the operation of the talker terminal according to the present embodiment. FIG. 3 is a flow chart showing an example of the operation of the voice server according to this embodiment. FIG. 4 is a flow chart showing an example of the operation of the listener terminal according to the present embodiment.

Figure 5:
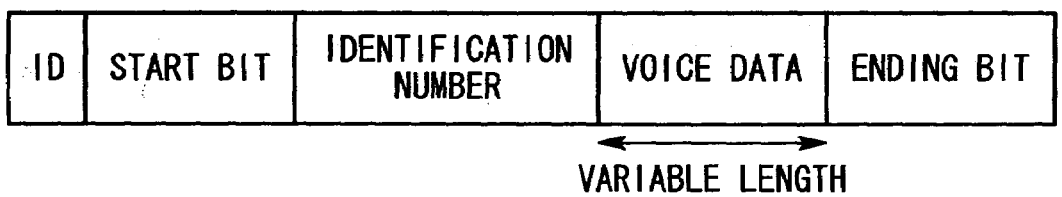
FIG. 5 is an explanatory figure showing an example of a voice packet.

First, voice input device 17 continues to wait voice input at talker terminal A. When voice is input, voice input device 17 generates voice data based on this voice. Terminal controller 13 generates voice packets that include the generated voice data. FIG. 5 is an explanatory figure showing an example of a voice packet. The voice packet consists of the talker terminal ID, start bit, identification number, voice data, and ending bit. The length of the voice data can be varied. Data sending and receiving section 11 sends the voice packet to voice server SA (step S21). Terminal controller 13 forms a check table that has columns corresponding to each listener terminal B to D (step S22), and sets the check time T (step S23).

At voice server SA, data sending and receiving section 5 receives the voice packet from talker terminal A (step S31). Buffer 6 stores the received voice packet. Buffer 6 not only stores voice packets from terminal A but from other terminals as well. Voice adding section 7 regularly mixes the voice packets in buffer 6 (step S32). Note that a plurality of IDs of each mixed voice packet is stored in the ID column for mixed voice packets (see FIG. 5). Data sending and receiving section 5 sends the mixed voice packet to listener terminals B to D that are accessing the same virtual space as talker terminal A based on the aforementioned administrative table (step S33).

At each listener terminal B to D, data sending and receiving section 11' continue to wait voice packets. When a voice packet is sent by voice server SA, data sending and receiving section 11' receives the voice packet (step S41). When a voice packet is received, terminal controller 13' determines whether or not the voice packet was accurately received based on the data form of the voice packet (step S42). Provided that the ID, start bit, identification number, and ending bit are present in the voice packet, and that the length of the voice data is not 0, then terminal controller 13' determines that the voice packet has been accurately received, and sends the ID and data indicating the accurate reception (hereinafter referred to as "ACK" data) to data sending and receiving section 11' (step S43). In addition, when a determination is made that the voice packet has been accurately received, then terminal controller 13' sends voice data contained in the voice packet to voice output device 18'. Voice output device 18' outputs a voice based on the voice data (step S44). On the other hand, if any one of the ID, start bit, identification number, or ending bit are not present in the voice packet, or if the voice data length is 0, then terminal controller 13' makes a determination that the voice packet was not received normally. In this case, terminal controller 13' sends the ID and data indicating the abnormal reception (hereinafter referred to as "NACK" data) to data sending and receiving section 11' (step S45). Data sending and receiving section 11' sends the above-described ACK/NACK data directly to the terminal that is indicated by the ID that was sent from terminal controller 13' along with the ACK/NACK data (i.e., talker terminal A). Data sending and receiving section 11' also directly sends the ID of the listener terminal in which data sending and receiving section 11' is included. Note that the above-described ACK/NACK and ID (of the listener terminal) need not be directly sent, but rather may be sent via voice server SA.

Figure 6:
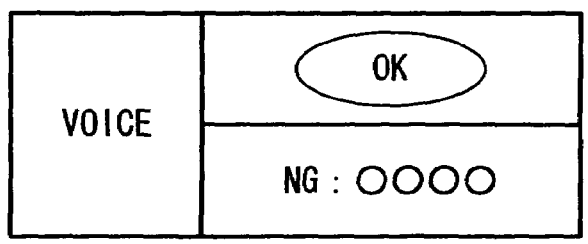
FIG. 6 is an explanatory figure showing an example of the display on a screen display device according to a first embodiment of the present invention.

At talker terminal A, data sending and receiving section 11 receives the above-described ACK/NACK and ID from listener terminals B to D. If an ACK is received, then, in the aforementioned check table, terminal controller 13 stores a value ("1" for example) that indicates this ACK, in the column for the terminal indicated by the ID that was received together with the ACK. On the other hand, if a NACK is received, then, in the aforementioned check table, terminal controller 13 stores a value ("0" for example) that indicates this NACK, in the column for the terminal indicated by the ID that was received together with the NACK. Terminal controller 13 continues to wait the ACK/NACK until a check time T has elapsed since the transmission of the voice packet (step S24). When check time T elapses, terminal controller 13 selects the listener terminals that sent an ACK, the listener terminals that sent a NACK and the listener terminals that did not send anything, based on the check table. If ACKs are received from all listener terminals, then terminal controller 13 displays an indicator "OK" on screen display device 14 (step S25, see FIG. 6). In contrast, if there is a terminal that sent a NACK, or a terminal which has not sent anything, then terminal controller 13 displays the ID of that terminal and the indicator "NG" on screen display device 14 (step S26, see FIG. 6). Using these screen displays, the user at talker terminal A can confirm whether or not his voice has reached the listener. Once terminal controller 13 has performed these screen displays, it cancels the check table (step S27).

This concludes the processing for sending and receiving voice data.

Note that in place of displaying an indicator "OK", terminal controller 13 may instead cause the user avatar at a listener terminal that has sent an ACK to perform a specific action (nodding, flashing, etc.). Also, when there are a plurality of terminals that have sent a NACK (or have not sent anything), then terminal controller 13 may display the ID of one optional terminal from among these.

2. Second Embodiment

A second embodiment of the present invention will now be explained in detail with reference to the accompanying figures.

The block diagram of the network system according to this embodiment is identical to the block diagram of the network system according to the first embodiment (see FIG. 1). However, the processing described in each block is different between the first and second embodiments. Accordingly, the processing according to this embodiment will now be explained. Of the processing performed in this embodiment however, the terminal log-in processing and the avatar update processing are identical to the processing explained under sections "(1) Terminal log-in" and "(2) Avatar update" for the first embodiment above. An explanation of these will therefore be omitted. The processing for sending and receiving voice data according to this embodiment will be explained below using as an example the case in which terminal A sends voice data to terminals B to D. Note that this is just one example, however, and that all of the terminals are of course capable of executing the same processing.

Figure 7:
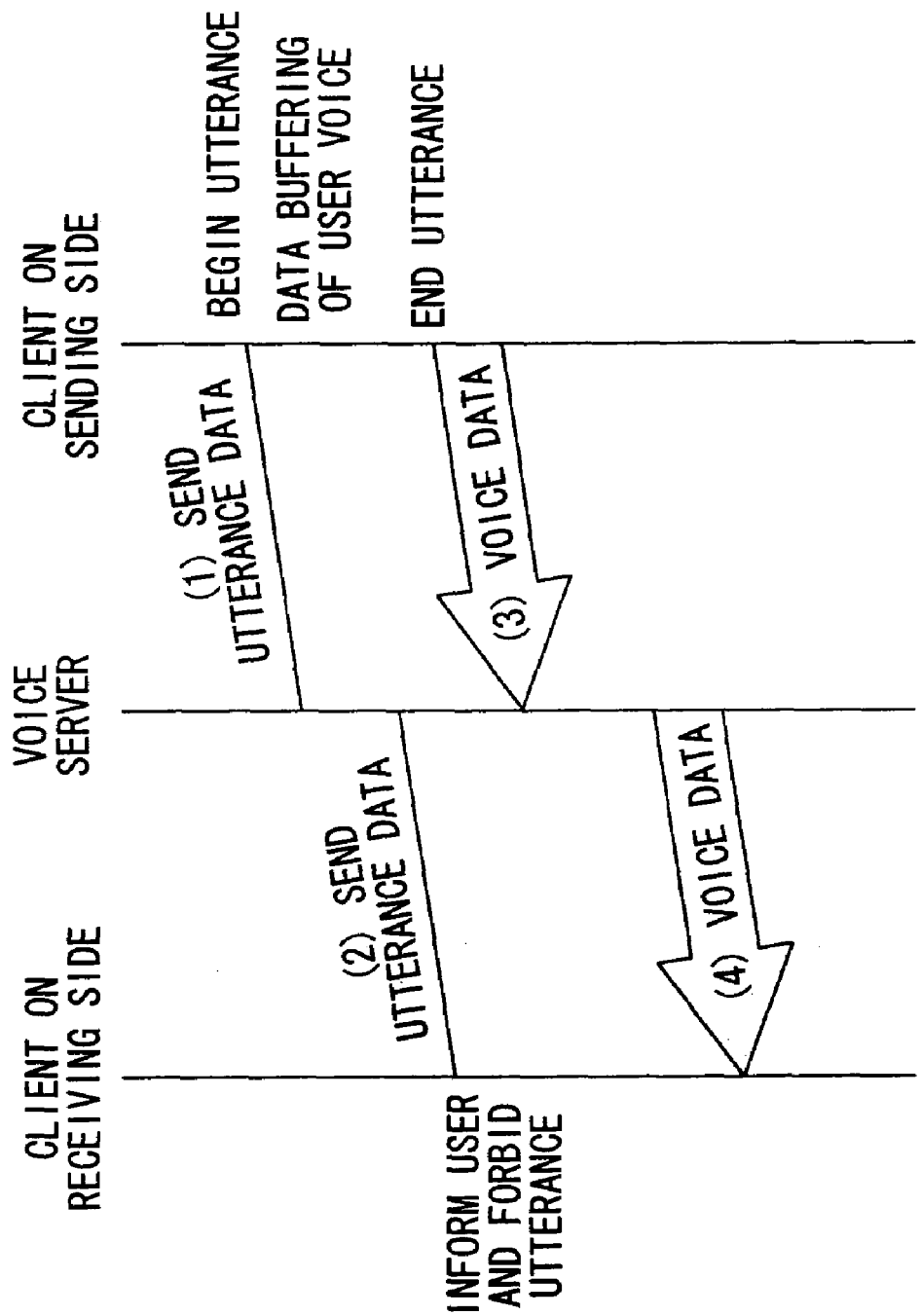
FIG. 7 is an explanatory figure showing an example of the processing sequence according to a second embodiment of the present invention.
Figure 9A:
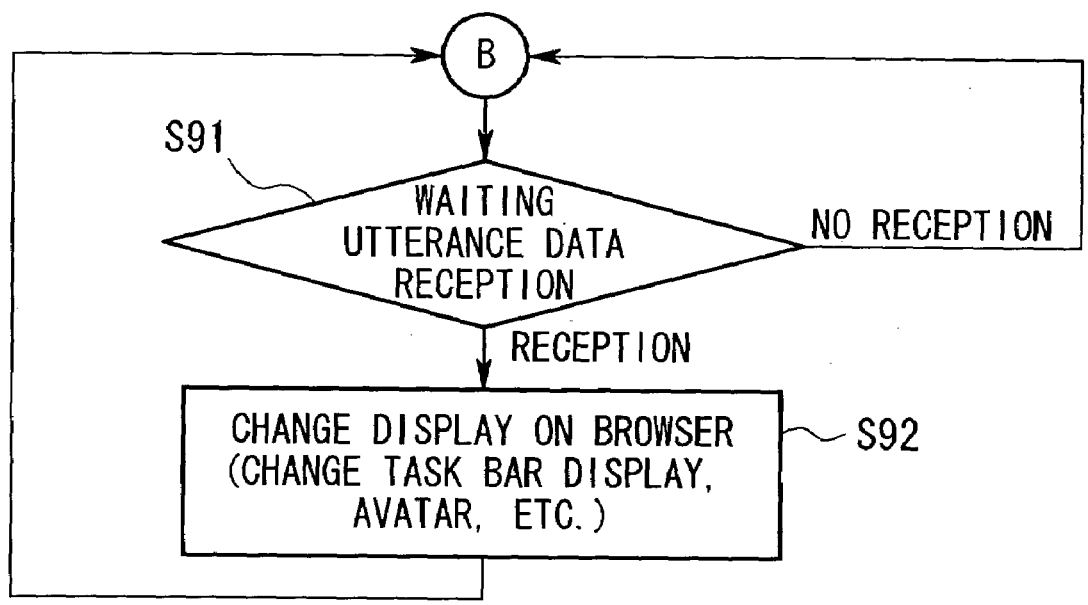
FIG. 9 is a flow chart showing an example of processing at the listener terminal according to a second embodiment of the present invention.
Figure 9B:
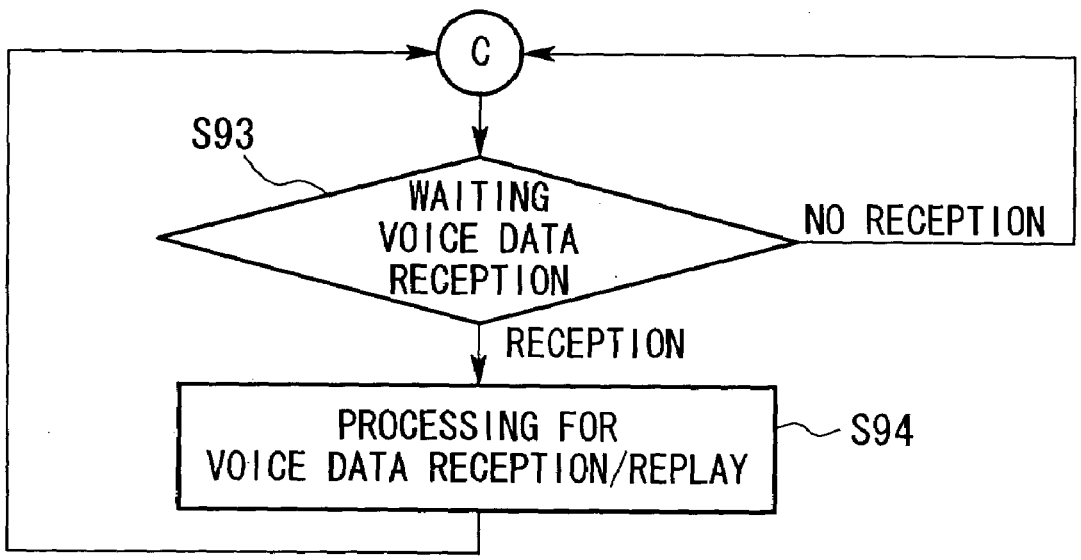

FIG. 7 is an explanatory figure showing an example of the processing sequence according to the present embodiment. FIG. 8 is a flow chart showing an example of the operation of the talker terminal according to this embodiment. FIG. 9 is a flow chart showing an example of the operation of the listener terminal according to this embodiment.

At talker terminal A, voice input device 17 continues to wait voice input (step S81). When voice is input, voice, input device 17 generates voice data based on this voice. At the same time, terminal controller 13 generates utterance data (step S82). Utterance data is data that is shorter than voice data. Data sending and receiving section 11 sends the utterance data to voice server SA along with the ID of talker terminal A. After sending the utterance data, terminal controller 13 generates a voice packet that includes voice data (step S83). Data sending and receiving section 11 sends the generated voice packet to voice server SA.

At voice server SA, data sending and receiving section 5 receives the utterance data (and the ID of talker terminal A) from talker terminal A. Data sending and receiving section 5 sends the received utterance data (and the ID of talker terminal A) to listener terminals B to D that are accessing the same virtual space as talker terminal A based on the aforementioned administrative table.

At each listener terminal B to D, data sending and receiving section 11' continues to wait utterance data (step S91). When utterance data is sent by voice server SA, data sending and receiving section 11' receives the utterance data (and the ID of talker terminal A). When utterance data is received, terminal controller 13' causes the avatar of the user of the terminal (terminal A here) indicated by the ID that was received together with the utterance data to carry out a specific action (step S92). Using this screen display, the users of listener terminals B to D can predict the arrival of voice data from talker terminal A. As a result, the users at listener terminals B to D can ascertain the timing of the next utterance. FIG. 10 is an explanatory figure showing an example of the action of the avatar. As shown in FIG. 10, when terminal controller 13' receives utterance data, it raises the hand on the avatar (i.e., state a→state b). When terminal controller 13' subsequently receives a voice packet, it lowers the hand on the avatar (i.e., state b→state c). In this case, since voice output according to the voice packet is not completed at the point in time at which the voice packet is received, the listener can anticipate the completion of the voice output based on the timing at which the avatar lowers his hand. As a result, the listener can begin to prepare his utterance with respect to this voice output. Note that in place of having the avatar perform a specific action, it is also acceptable for terminal controller 13' to display an advance notice for the arrival of voice data on the task bar of the browser window in screen display device 14'. In addition, listener terminals B to D can select a display/don't display option for the indicator (i.e., action performed by the avatar, task bar display, etc.) that indicates that utterance data has been received.

At voice server SA, data sending and receiving section 5 receives the voice packet from talker terminal A. Buffer 6 stores the received voice packet. Buffer 6 not only stores voice packets from terminal A but from other terminals as well. Voice adding section 7 regularly mixes the voice packets in buffer 6. Note that a plurality of IDs of each mixed voice packet is stored in the ID column for mixed voice packets (see FIG. 5). Data sending and receiving section 5 sends the mixed voice packet to listener terminals B to D that are accessing the same virtual space as talker terminal A based on the aforementioned administrative table.

At each listener terminal B to D, data sending and receiving section 11' continues to wait voice packets (step S93). When a voice packet is sent by voice server SA, data sending and receiving section 11' receives the voice packet. Terminal controller 13' sends the voice data contained in the received voice packet to voice output device 18'. Voice output device 18' outputs a voice based on this voice data (step S94).

This concludes the processing for sending and receiving voice data.

Figure 11:
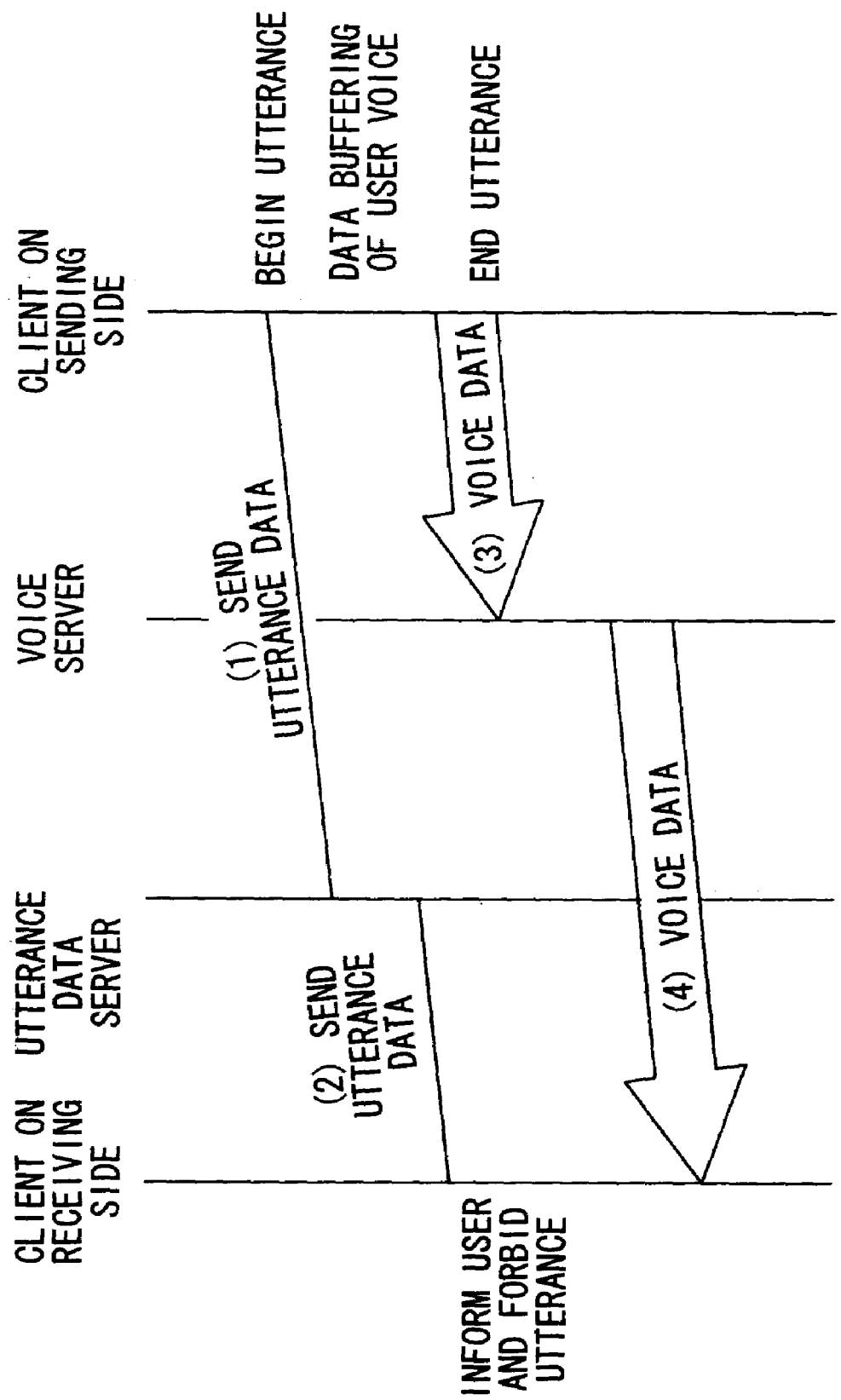
FIG. 11 is an explanatory figure showing another example of the processing sequence according to a second embodiment of the present invention.

Note that in the present embodiment, as shown in FIG. 7, the voice server processes both utterance data and voice data. However, the present embodiment is not limited thereto. Rather, as shown in FIG. 11, a server used exclusively to process utterance data (hereinafter referred to as "utterance server") may be provided in addition to the voice server. In this case, the overall process is identical to that shown in FIG. 7, however, the utterance server processes only utterance data, while the voice server processes only voice data. With this design, the present embodiment can be easily realized without changing the existing voice server. Moreover, with this design, the present embodiment can also be suitably applied to a conventional system without increasing the burden on the voice server.

3. Third Embodiment

A third embodiment of the present invention will now be explained in detail with reference to the accompanying figures.

(1) EXAMPLE 1

Figure 12:
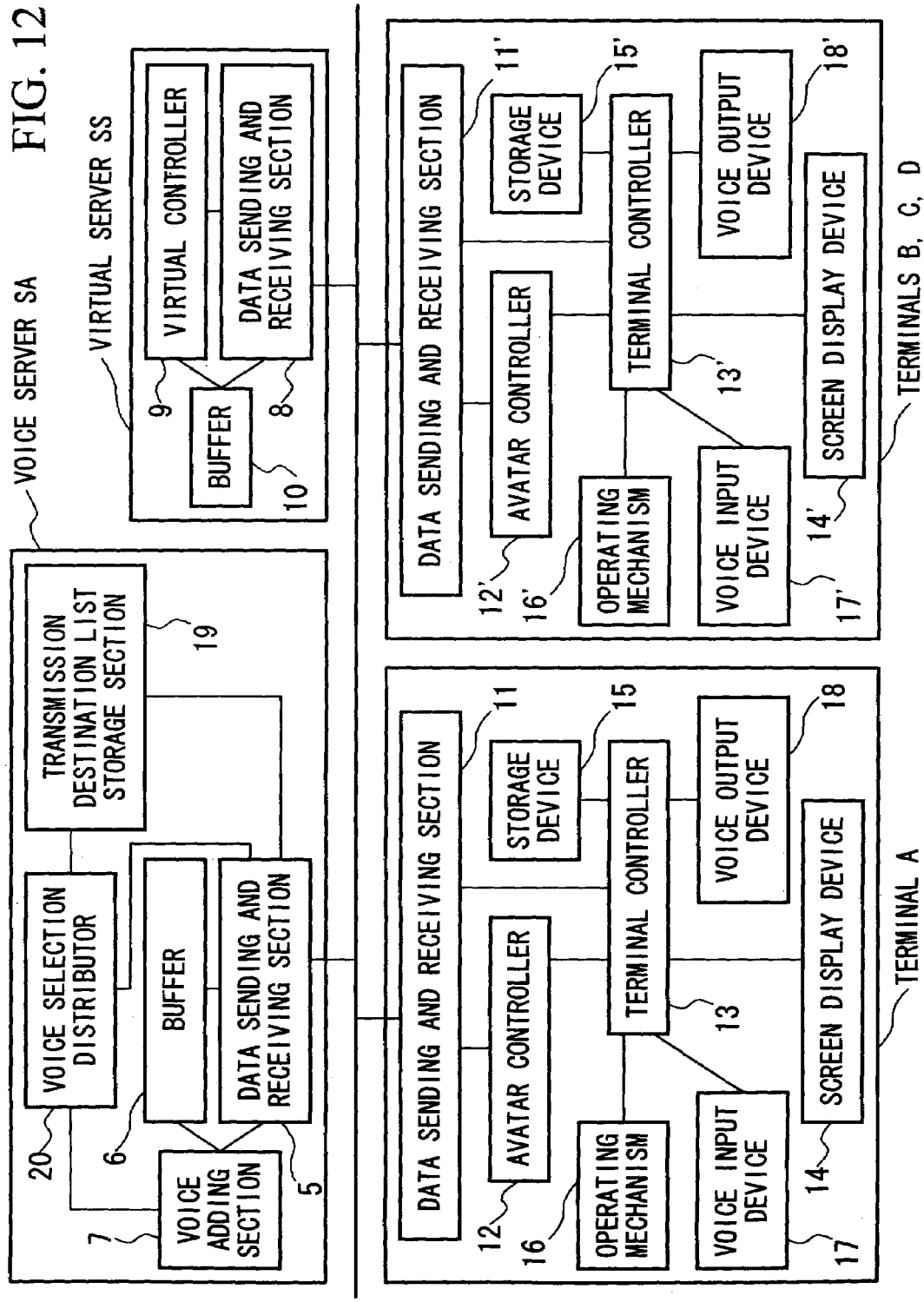
FIG. 12 is a block diagram showing an example of the design of the network system in Example 1 according to a third embodiment of the present invention.

FIG. 12 is a block diagram showing an example of the design of a network system according to Example 1 of this embodiment. The design of the network system according to this example differs from the design of the network system according to first embodiment (see FIG. 1) in that a transmission destination list storage section 19 and a voice selection distributor 20 have been newly provided here.

The processing according to this example will now be explained. Of the processing performed in this example however, the terminal log-in processing and the avatar update processing are identical to the processing explained under sections "(1) Terminal log-in" and "(2) Avatar update" of the first embodiment above. An explanation of these will therefore be omitted. The processing for sending and receiving voice data according to this example will be explained below using as an example the case in which terminal A designates terminals B and C as the transmission destinations for its voice data, and sends the voice data to these terminals. Note that this is just one example, however, and that all of the terminals are of course capable of executing the same processing.

Figure 13:
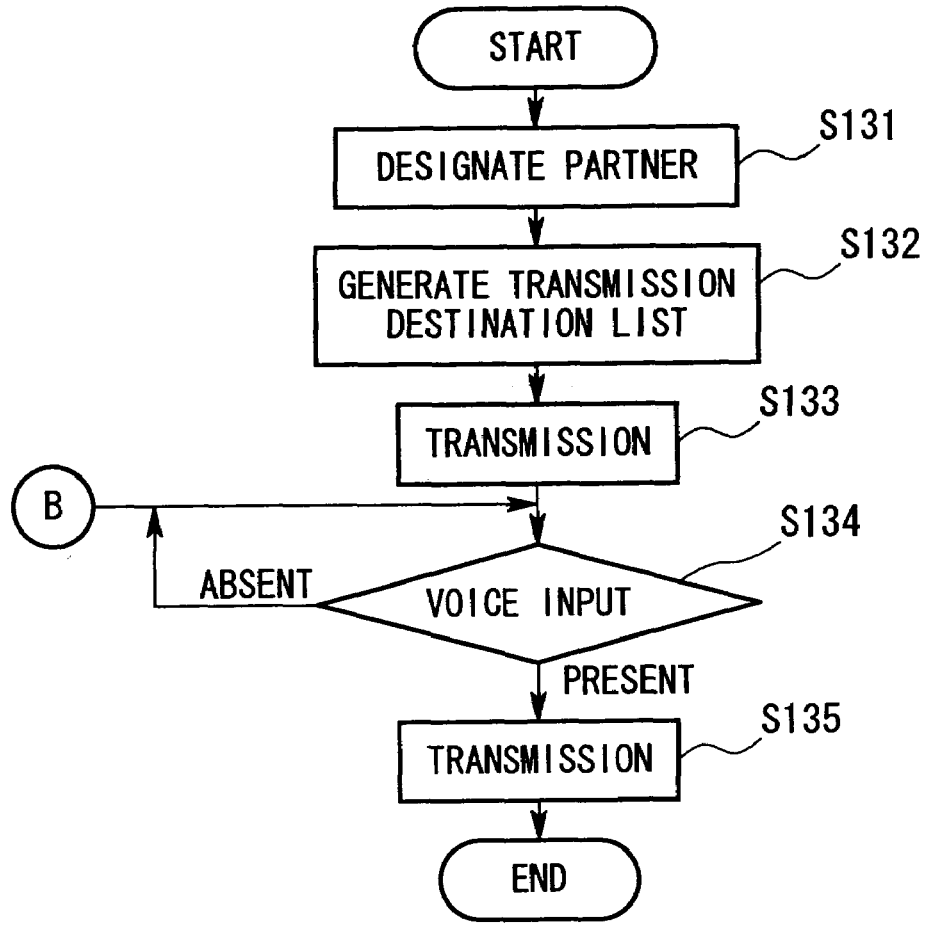
FIG. 13 is a flow chart showing an example of the processing at the talker terminal in Example 1 according to a third embodiment of the present invention.
Figure 15:
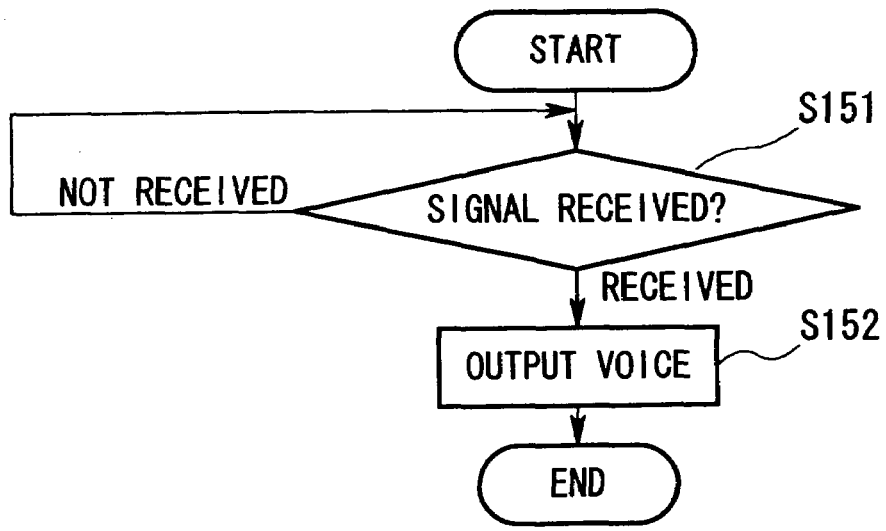
FIG. 15 is a flow chart showing an example of the processing at the listener terminal in Example 1 according to a third embodiment of the present invention.
Figure 14:
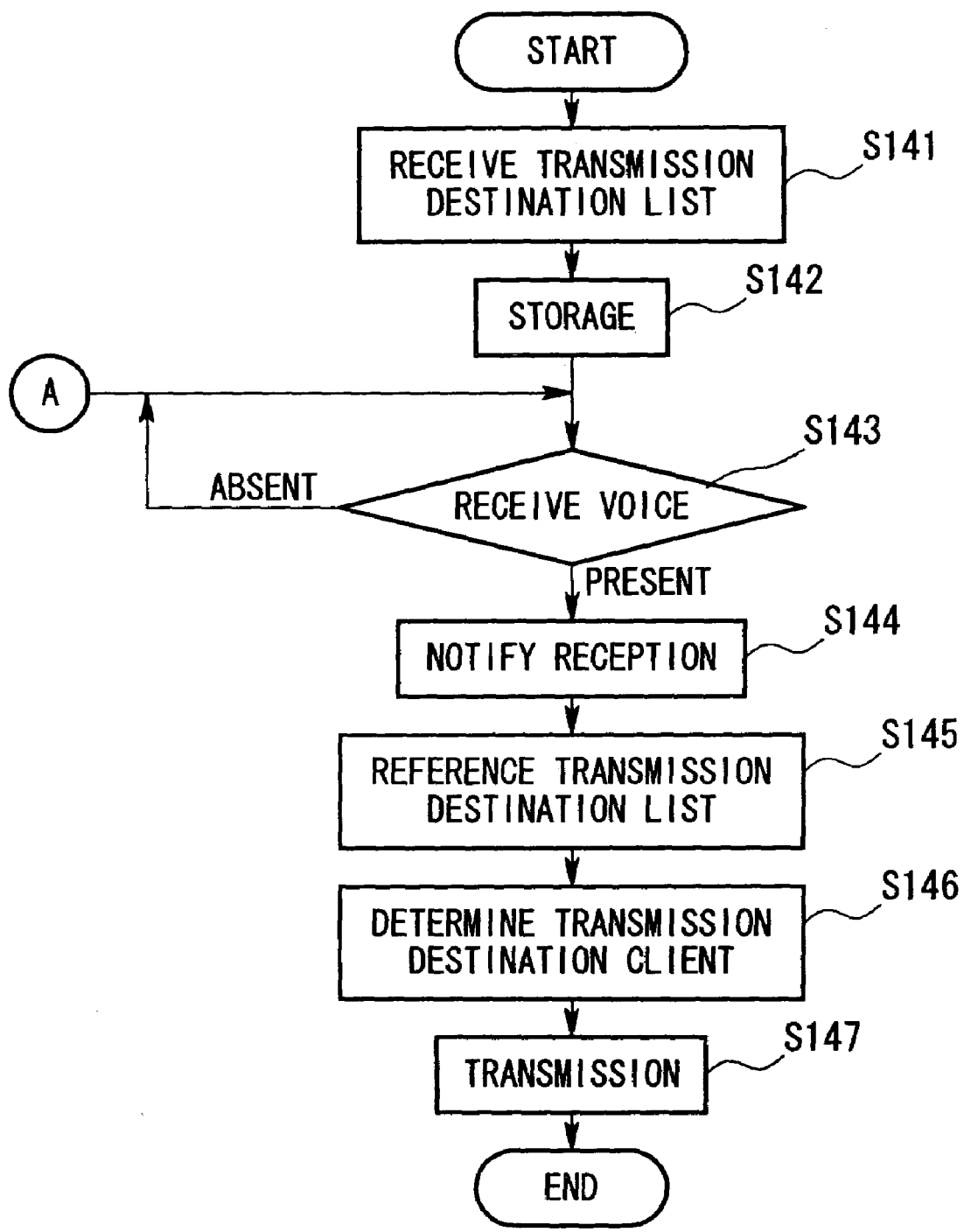
FIG. 14 is a flow chart showing an example of the processing at the voice server in Example 1 according to a third embodiment of the present invention.

FIG. 13 is a flow chart showing an example of the operation of the talker terminal according to the present example. FIG. 14 is a flow chart showing an example of the operation of the voice server according to this example. FIG. 15 is a flow chart showing an example of the operation of the listener terminal according to this example.

Figure 16:
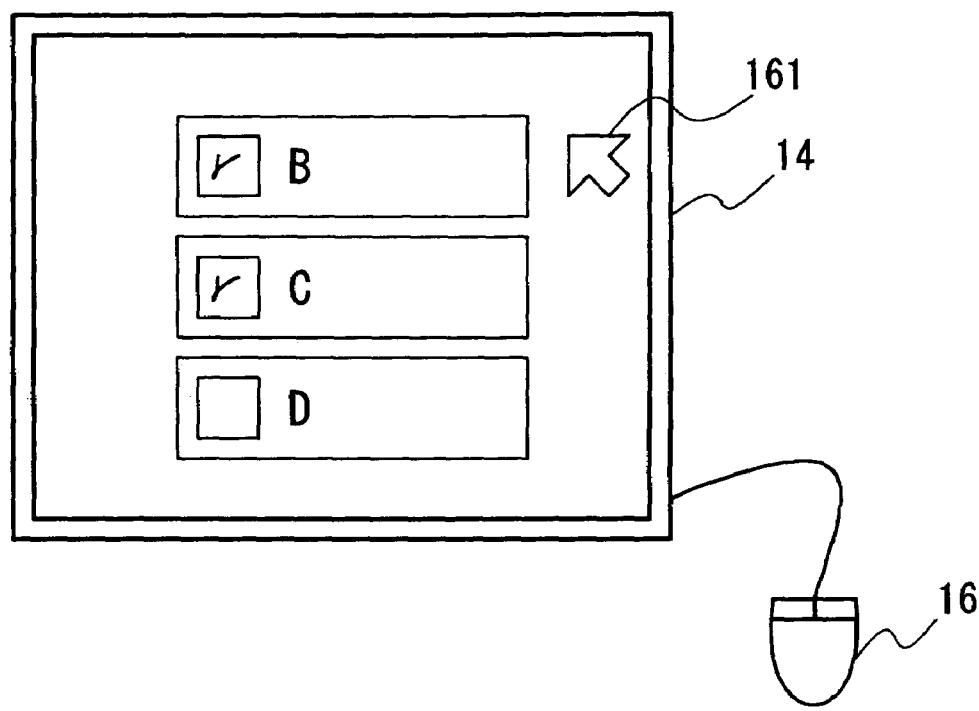
FIG. 16 is an explanatory figure showing an example of the method for terminal designation in Example 1 according to a third embodiment of the present invention.

At talker terminal A, screen display device 14 and operating mechanism 16 are used to designate which terminals should be transmission destinations for voice data from their terminal (i.e., terminal A) (step S131). FIG. 16 is an explanatory figure showing an example of the method for designating the terminal according to this example. In FIG. 16, screen display device 14 is a CRT display (or liquid crystal display), and operating mechanism 16 is a mouse. The user of talker terminal A moves cursor 161 and marks a check box displayed on screen display device 14, thereby designating a terminal that should be a transmission destination for voice data from its terminal. Terminals B and C have been designated in the example shown in FIG. 16. When the terminals which are to be the transmission destinations have been designated, terminal controller 13 generates a transmission destination list based on these designations (step S132). Data sending and receiving section 11 sends the generated transmission destination list to voice server SA (step S133).

At voice server SA, data sending and receiving section 5 receives the transmission destination list from terminal A (step S141). Data sending and receiving section 5 stores the received transmission destination list in transmission destination list storage section 19 (step S142).

Next, at talker terminal A, voice input device 17 continues to wait voice inputs (step S134). When a voice is input, voice input device 17 generates voice data based on the voice. Terminal controller 13 generates voice packets containing the generated voice data. Data sending and receiving section 11 sends the generated voice packets to voice server SA (step S135).

At voice server SA, data sending and receiving section 5 continues to wait voice packets (step S143). When a voice packet is sent by talker terminal A, data sending and receiving section 5 receives the voice packet. Buffer 6 stores the received voice packets. Note that buffer 6 stores voice packets not only from terminal A, but also from the other terminals. Data sending and receiving section 5 notifies voice selection distributor 20 of the voice packet reception (step S144). Voice selection distributor 20 references the transmission destination list in transmission destination list storage section 19 (step S145), and determines the terminal which is to be the transmission destination of the voice packet based on the results of this reference (step S146). This terminal ID is notified to voice adding section 7 and data sending and receiving section 5. From among the voice packets in buffer 6, voice adding section 7 regularly mixes voice packets provided with the ID that was informed from voice selection distributor 20. Note that a plurality of IDs of each mixed voice packet is stored in the ID column for mixed voice packets (see FIG. 5). Data sending and receiving section 5 sends the mixed voice packet to the listener terminals that are indicated by the IDs that were informed from voice selection distributor 20 (terminals B and C in the case of the example shown in FIG. 16) (step S147).

At each listener terminal B and C, data sending and receiving section 11' continues to wait voice packets (step S151). When a voice packet is sent by voice server SA, data sending and receiving section 11' receives the voice packet. Terminal controller 13' sends the voice data contained in the received voice packet to voice output device 18', and voice output device 18' outputs a voice based on this voice data (step S152).

This concludes the processing for sending and receiving voice data.

(2) EXAMPLE 2

FIG. 17 is a block diagram showing an example of the design of a network system according to Example 2 of this embodiment. The design of the network system according to this example differs from the design of the network system according to Example 1 (see FIG. 12) in that a user authority administrator 21 has been newly provided here.

The processing according to this example will now be explained. Of the processing performed in this example however, the terminal log-in processing and the avatar update processing are identical to the processing explained under sections "(1) Terminal log-in" and "(2) Avatar update" for the first embodiment above. An explanation of these will therefore be omitted. The processing for sending and receiving voice data according to this example will be explained below using as an example the case in which terminal A designates the voice data transmission destination for each terminal, and sends voice data to terminals B to D. Note that this is just one example, however, and that all of the terminals are of course capable of executing the same processing.

Figure 18:
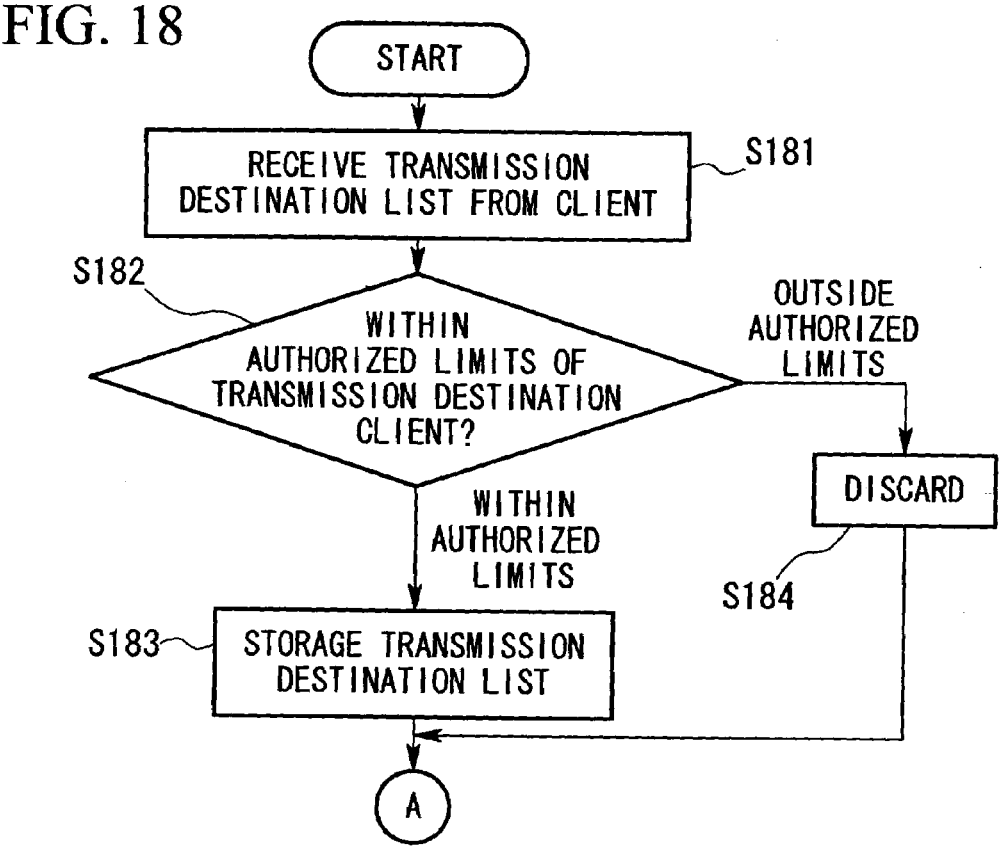
FIG. 18 is a flow chart showing an example of the processing at the voice server in Example 2 according to a third embodiment of the present invention.

The operation of the talker terminal and the listener terminal according to this example is the same as that of the talker terminal (see FIG. 13) and the listener terminal (see FIG. 15) in Example 1. The operation of the voice server in this example, however, differs from that of the voice server in Example 1 in that the steps shown in FIG. 18 are executed instead of steps S141 and S142 shown in FIG. 14.

Figure 19:
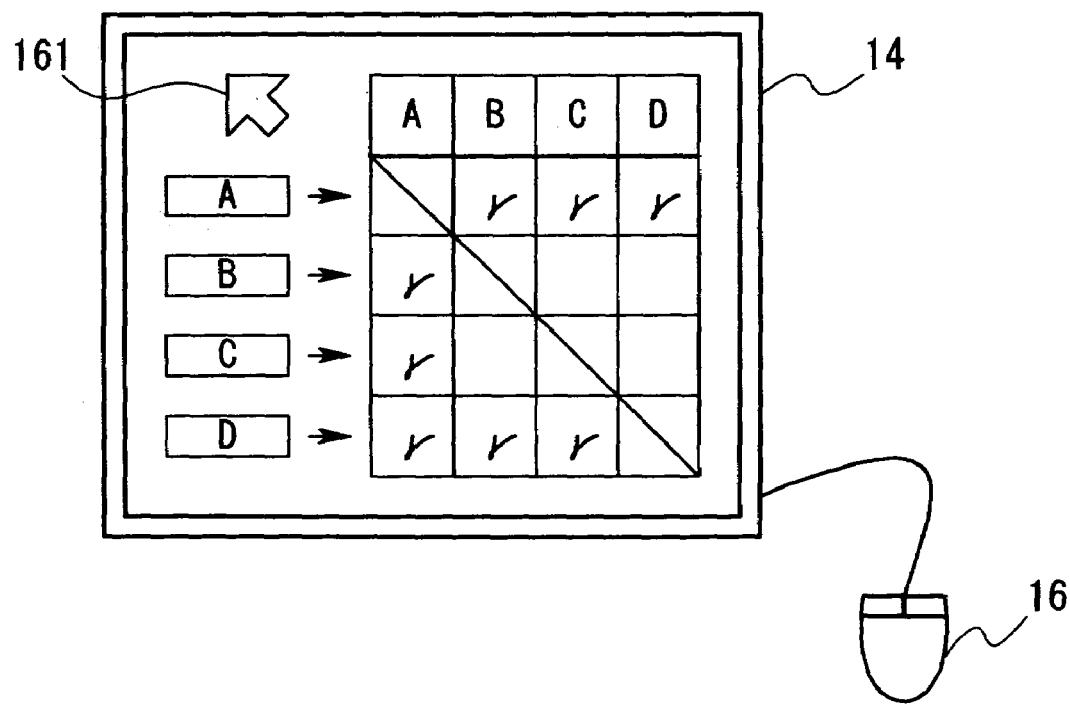
FIG. 19 is an explanatory figure showing an example of the method for terminal designation in Example 2 according to a third embodiment of the present invention.

At talker terminal A, screen display device 14 and operating mechanism 16 are used to designate the terminal that is to be the voice data transmission destination for an optional terminal (step S131). FIG. 19 is an explanatory figure showing an example of the method for designating the terminal according to this example. The user of terminal A moves a cursor 161 and marks a check box on display screen device 14, thereby designating the terminal which is to be the voice data transmission destination for an optional terminal. In the example shown in FIG. 19, terminals B to D have been designated as the transmission destinations for terminal A, terminal A has been designated as the transmission destination for terminal B, terminal A has been designated as the transmission destination for terminal C, and terminals A to C have been designated as the transmission destinations for terminal D. When a terminal is designated as a transmission destination, terminal controller 13 generates a transmission destination list based on these designations (step S132). Data sending and receiving section 11 sends the generated transmission destination list to voice server SA (step S133).

At voice server SA, data sending and receiving section 5 receives the transmission destination list from terminal A (step S181). User authority administrator 21 determines whether or not the content of the transmission destination list is within the authorized limits of the user of terminal A (step S182). If the transmission destination list is within the authorized limits, then user authority administrator 21 stores the transmission destination list in transmission destination list storage section 19 (step S183). In contrast, if the transmission destination list is outside the authorized limits, then user authority administrator 21 discards the transmission destination list (step S184).

When the transmission destination list is stored in transmission destination list storage section 19 as a result of the preceding processing, the talker terminal, listener terminal and voice server each send and receive voice data by the same methods as used in Example 1 (i.e., steps S134, S135 in FIG. 13 for the talker terminal, steps shown in FIG. 15 for the listener terminal, and steps S143 to S147 in FIG. 14 for the voice server).

(3) EXAMPLE 3

Figure 20:
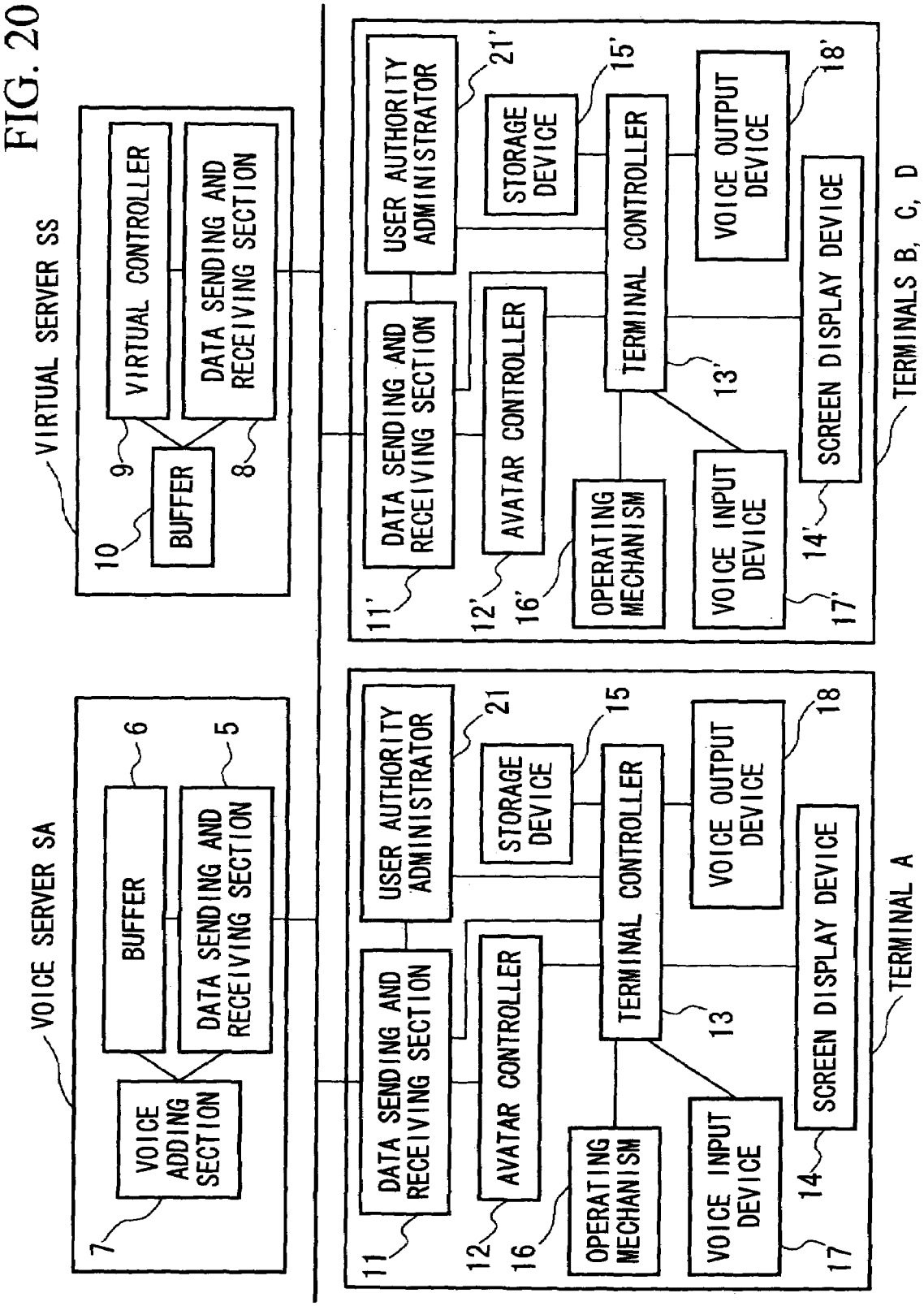
FIG. 20 is a block diagram showing an example of the design of the network system in Example 3 according to a third embodiment of the present invention.

FIG. 20 is a block diagram showing an example of the design of a network system according to Example 3 of this embodiment. The design of the network system according to this example differs from the design of the network system according to Example 2 (see FIG. 17) in that user authority administrators 21 have been provided to each terminal A to D (and not inside voice server SA).

The processing according to this example will now be explained. Of the processing performed in this example however, the terminal log-in processing and avatar update processing are identical to the processing explained under sections "(1) Terminal log-in" and "(2) Avatar update" for the first embodiment. An explanation of these will therefore be omitted. The processing for sending and receiving voice data according to this example will be explained below using as an example the case in which terminal A designates the voice data transmission destination for each terminal, and sends voice data to terminals B to D. Note that this is just one example, however, and that all of the terminals are of course capable of executing the same processing.

Figure 21:
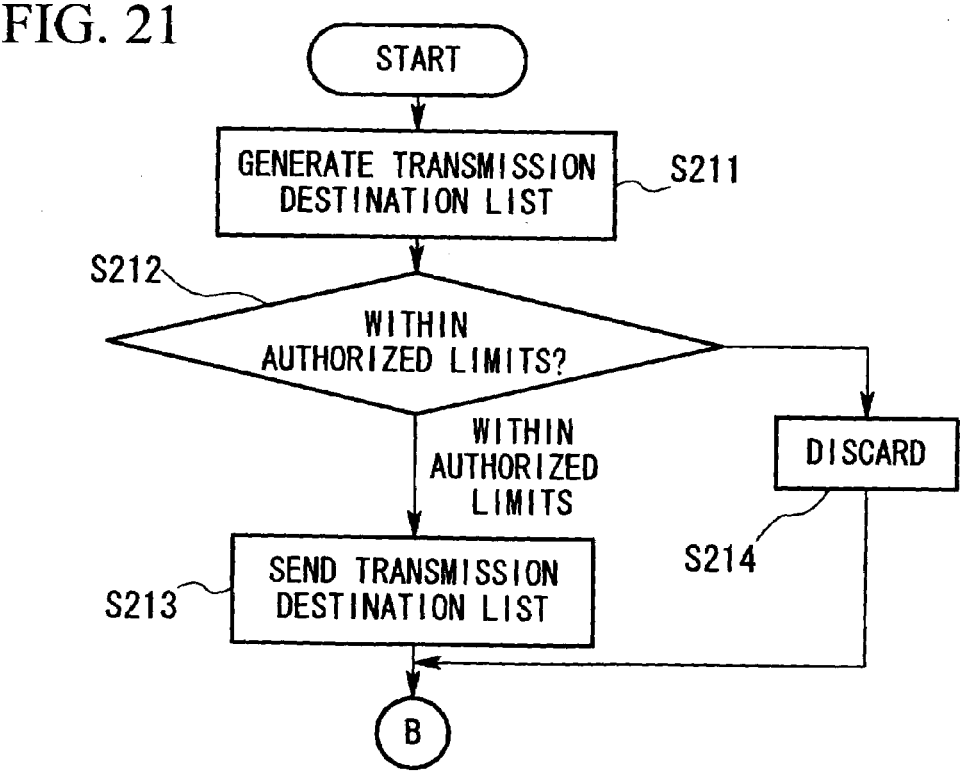
FIG. 21 is a flow chart showing an example of the processing at the talker terminal in Example 3 according to a third embodiment of the present invention.

The operation of the listener terminal and the voice server according to this example are the same as that of the listener terminal (see FIG. 15) and the voice server (see FIG. 14) in Example 1. The operation of the talker terminal in this example, however, differs from that of the talker terminal in Example 1 in that the steps shown in FIG. 21 are executed instead of steps S131 to S133 shown in FIG. 13.

At talker terminal A, screen display device 14 and operating mechanism 16 are used to designate the terminal that is be the voice data transmission destination of an optional terminal. The method for designating the terminal in this third example is the same as the method for designating the terminal in Example 2 (see FIG. 19). When the terminal which is to be the transmission destination is designated, terminal controller 13 generates a transmission destination list based on this designation (step S211). User authority administrator 21 determines whether or not the content of the transmission destination list is within the authorized limits of the user of terminal A (step S212). If the transmission destination list is within the authorized limits, then data sending and receiving section 11 sends the transmission destination list to voice server SA (step S213). In contrast, if the transmission destination list is outside the authorized limits, then user authority administrator 21 discards the transmission destination list (step S214).

At voice server SA, data sending and receiving section 5 receives the transmission destination list from terminal A (step S141). Data sending and receiving section 5 stores the received transmission destination list in transmission destination list storage section 19 (step S142).

When the transmission destination list is stored in transmission destination list storage section 19 as a result of the preceding processing, the talker terminal, listener terminal and voice server each send and receive voice data by the same methods as used in Example 1 (i.e., steps S134, S135 in FIG. 13 for the talker terminal, steps shown in FIG. 15 for the listener terminal, and steps S143 to S147 in FIG. 14 for the voice server).

4. Fourth Embodiment

A fourth embodiment of the present invention will now be explained in detail.

This embodiment combines the preceding first through third embodiments. The block diagram of the network system according to this embodiment is identical to the block diagram of the network system according to the third embodiment. Namely, if a check of the transmission destination list is not performed, then FIG. 12 is the block diagram of the network system according to this embodiment. If voice server SA performs a check of the transmission destination list, then FIG. 17 is the block diagram of the network system according to this embodiment. If the terminal (that designates the transmission destination list) performs a check of the transmission destination list, then FIG. 20 is the block diagram of the network system according to this embodiment. However, the processing performed in each block is different between this embodiment and the third embodiment. Therefore, the processing performed in this embodiment will be explained below using as an example the case in which voice server SA checks the transmission destination list generated at terminal A, after which terminal A sends voice data to terminals B to D. Note that this is just one example, however, and that all of the terminals are of course capable of executing the same processing.

In order that the characteristic feature of this embodiment (i.e., the manner of combining Embodiments 1 to 3) be made clear in the following explanation, only the overall image of the processing performed in this embodiment will be explained. Namely, the details of processing in this embodiment which are not directly related to the embodiment's characteristic feature conform to the processing of Embodiments 1 to 3.

First, transmission destinations are designated by operating mechanism 16 at terminal A. Terminal controller 13 generates a transmission destination list based on the designated transmission destinations. Data sending and receiving section 11 sends the generated transmission destination list to voice server SA.

At voice server SA, data sending and receiving section 5 receives the transmission destination list from terminal A. User authority administrator 21 determines whether or not the content of the received transmission destination list is within the authorized limits of the user of terminal A. If the transmission destination list is within the authorized limits, then user authority administrator 21 stores the transmission destination list in transmission destination list storage section 19.

After that, at talker terminal A, voice is input from voice input device 17. When the voice is input, terminal controller 13 generates utterance data. Data sending and receiving section 11 sends the generated utterance data to voice server SA.

At voice server SA, data sending and receiving section 5 receives utterance data from terminal A. Voice selection distributor 20 determines the transmission destination for the received utterance data based on the transmission destination list. Data sending and receiving section 5 sends the utterance data to the determined transmission destinations (i.e., terminals B to D).

Data sending and receiving section 11' at terminals B to D receive utterance data from voice server SA. Terminal controller 13' raises the hand of the avatar of the user of the talker terminal on screen display device 14'.

On the other hand, at terminal A, terminal controller 13 generates voice packet based on the input voice. Data sending and receiving section 11 sends the generated voice packet to voice server SA.

At voice server SA, data sending and receiving section 5 receives the voice packet from terminal A. Voice selection distributor 20 determines the transmission destination of the received voice packet based on the transmission destination list. Data sending and receiving section 5 sends the voice packet to the determined transmission destination (i.e., terminals B to D).

At terminals B to D, data sending and receiving section 11' receives voice packet from voice server SA. Terminal controller 13' determines whether or not the voice packet was accurately received. If the voice packet was accurately received, then voice output device 18' outputs a voice based on the voice packet. Terminal controller 13' generates an ACK/NACK based on the results of the reception. Data sending and receiving section 11' sends the generated ACK/NACK to terminal A.

At terminal A, data sending and receiving section 11 receives an ACK/NACK from terminals B to D. Screen display device 14 displays the reception state "OK" or "NG" based on the ACK/NACK received.

This concludes the processing for sending and receiving voice data.

5. Supplement

Embodiments of the present invention were explained in detail above with reference to the accompanying figures. However, the specific design of the present invention is not limited to these embodiments. Namely, the present invention includes variations in design, provided that they do not depart from the scope of the invention.

For example, each of the preceding embodiments was explained using as an example a terminal that is accessing a virtual space. However, the present invention may also be applied to a terminal that is not accessing a virtual space. Namely, provided that there is at the minimum a specific display device (a lamp for example) and a telephone, then these may be used in place of the above-described terminal.

In addition, each of the preceding embodiments was explained using as an example a network system composed of multiple terminals A to D, virtual server SS, and voice server SA. However, it is also acceptable to apply the first and second embodiments to a network system in which each terminal carries out peer-to-peer communications (not passing through the server).

Combining the first through third embodiments was indicated in the above-described fourth embodiment. However, the present invention is not limited thereto. Namely, it is also acceptable to apply the same method as used in the fourth embodiment to combining only the first and second embodiments, only the second and third embodiments, or only the third and first embodiments.

What is claimed is:

1. A voice communications method comprising:
   a process at a voice input terminal at which voice is input for generating voice data indicating said voice;
   a process at a server for receiving said voice data;
   a process at said server for sending said voice data to a predetermined terminal;
   a process at said predetermined terminal for receiving said voice data;
   a process at said predetermined terminal that received said voice data for outputting the voice indicated by said voice data;
   a process at said predetermined terminal that received said voice data for generating a reception result of said voice data;
   a process at said voice input terminal that generated said voice data for receiving said reception result; and
   a process at said voice input terminal that received said reception result for visually indicating a reception state of said voice data based on said reception result.

2. A voice communications method according to claim 1, wherein said process for indicating said reception state indicates said reception state by indicating an action of an avatar of a user of the terminal that received said voice data.

3. A voice communications method according to claim 1, wherein:
   said reception result is an ACK message or a NACK message; and
   said process for indicating said reception state indicates that said voice data was correctly received if said ACK message was received within a predetermined period of time after a transmission of said voice data, and indicates that said voice data was not correctly received if said NACK message was received within said predetermined period of time or if no message was received within said predetermined period of time.

4. A voice communications method according to claim 1, wherein
   said process for generating said reception result adds an ID of the terminal that received said voice data to said reception result; and
   said process for indicating said reception state indicates said ID along with said reception state.

5. A voice communications method according to claim 1, wherein said process for generating said reception result generates said reception result based on a data form of said voice data.

6. A voice communications method comprising:
   a process at a terminal at which voice is input for generating and sending utterance data, which is shorter than a voice data indicating said voice and which is data indicating an utterance;
   a process at a server for receiving said utterance data;
   a process at said server for sending said utterance data to a predetermined terminal;
   a process at said predetermined terminal for receiving said utterance data;
   a process at said predetermined terminal that received said utterance data for indicating the utterance by the terminal that sent said utterance data;
   a process at the terminal that sent said utterance data for generating said voice data;
   a process at said server for receiving said voice data;
   a process at said server for sending said voice data to said predetermined terminal;
   a process at said predetermined terminal for receiving said voice data; and
   a process at said predetermined terminal that received said voice data for outputting the voice indicated by said voice data.

7. A voice communications method according to claim 6, wherein said process for indicating said utterance indicates said utterance by indicating an action of an avatar of a user of the terminal that sent said utterance data.

8. A voice communications method according to claim 6, wherein the server for processing said utterance data and the server for processing said voice data are different.

9. A voice communications method comprising:
a process at a server for storing permission or denial for sending data from one optional terminal to another optional terminal;
a process at a voice input terminal at which voice is input for generating and sending voice data indicating said voice;
a process at said server for receiving said voice data;
a process at said server for sending said voice data to a voice receiving terminal to which data is permitted to be sent from said voice input terminal that sent said voice data;
a process at said voice receiving terminal to which data is permitted to be sent from said voice input terminal that sent said voice data for receiving said voice data; and
a process at said voice receiving terminal that received said voice data for outputting the voice indicated by said voice data.

10. A voice communications method according to claim 9, comprising:
a process at a predetermined terminal for designating permission or denial for sending data from said predetermined terminal to another optional terminal;
wherein said process for storing stores the designation.

11. A voice communications method according to claim 9, comprising:
a process at a predetermined terminal for designating permission or denial for sending data from one optional terminal to another optional terminal;
wherein said process for storing stores the designation if said designation is within the authorized limits of the predetermined terminal, or discards said designation if said designation is outside the authorized limits of the predetermined terminal.

12. A voice communications method according to claim 9, comprising:
a process at a predetermined terminal for designating permission or denial for sending data from one optional terminal to another optional terminal; and
a process at said predetermined terminal for sending said designation to said server if the designation is within the authorized limits of said predetermined terminal, or discarding said designation if the designation is outside the authorized limits of said predetermined terminal;
wherein said process for storing stores the designation sent by said predetermined terminal.

13. A voice communications method comprising:
a process at a server for storing permission or denial for sending data from one optional terminal to another optional terminal;
a process at a voice input terminal at which voice is input for generating and sending utterance data, which is shorter than a voice data indicating said voice and which is data indicating an utterance;
a process at said server for receiving said utterance data;
a process at said server for sending said utterance data to a voice receiving terminal to which data is permitted to be sent from said voice input terminal that sent said utterance data;
a process at said voice receiving terminal to which data is permitted to be sent from said voice input terminal that sent said utterance data for receiving said utterance data;
a process at said voice receiving terminal that received said utterance data for indicating the utterance by said voice input terminal that sent said utterance data;
a process at said voice input terminal that sent said utterance data for generating and sending said voice data;
a process at said server for receiving said voice data;
a process at said server for sending said voice data to said voice receiving terminal to which data is permitted to be sent from said voice input terminal that sent said voice data;
a process at said voice receiving terminal to which data is permitted to be sent from said voice input terminal that sent said voice data for receiving said voice data;
a process at the terminal that received said voice data for outputting the voice indicated by said voice data;
a process at said voice receiving terminal that received said voice data for generating and sending a reception result of said voice data;
a process at said voice input terminal from which data is permitted to be sent to the terminal that sent said reception result for receiving said reception result; and
a process at said voice input terminal that received said reception result for indicating a reception state of said voice data based on said reception result.

14. A voice communications system comprising:
a means at a voice input terminal at which voice is input for generating voice data indicating said voice;
a means at a server for receiving said voice data;
a means at said server for sending said voice data to a predetermined terminal;
a means at said predetermined terminal for receiving said voice data;
a means at said predetermined terminal that received said voice data for outputting the voice indicated by said voice data;
a means at said predetermined terminal that received said voice data for generating a reception result of said voice data;
a means at said voice input terminal that generated said voice data for receiving said reception result; and
a means at said voice input terminal that received said reception result for visually indicating a reception state of said voice data based on said reception result.

15. A voice communications system according to claim 14, wherein said means for indicating said reception state indicates said reception state by indicating an action of an avatar of a user of the terminal that received said voice data.

16. A voice communications system according to claim 14, wherein:
said reception result is an ACK message or a NACK message; and
said means for indicating said reception state indicates that said voice data was correctly received if said ACK message was received within a predetermined period of time after a transmission of said voice data, and indicates that said voice data was not correctly received if said NACK message was received within said predetermined period of time or if no message was received within said predetermined period of time.

17. A voice communications system according to claim 14, wherein
said means for generating said reception result adds an ID of the terminal that received said voice data to said reception result; and
said means for indicating said reception state indicates said ID along with said reception state.

18. A voice communications system according to claim 14, wherein said means for generating said reception result generates said reception result based on a data form of said voice data.

19. A voice communications system comprising:
a means at a terminal at which voice is input for generating and sending utterance data, which is shorter than a voice data indicating said voice and which is data indicating an utterance;
a means at a server for receiving said utterance data;
a means at said server for sending said utterance data to a predetermined terminal;
a means at said predetermined terminal for receiving said utterance data;
a means at said predetermined terminal that received said utterance data for indicating the utterance by the terminal that sent said utterance data;
a means at the terminal that sent said utterance data for generating said voice data; a means at said server for receiving said voice data;
a means at said server for sending said voice data to said predetermined terminal;
a means at said predetermined terminal for receiving said voice data; and
a means at said predetermined terminal that received said voice data for outputting the voice indicated by said voice data.

20. A voice communications system according to claim 19, wherein said means for indicating said utterance indicates said utterance by indicating an action of an avatar of a user of the terminal that sent said utterance data.

21. A voice communications system according to claim 19, wherein the server for processing said utterance data and the server for processing said voice data are different.

22. A voice communications system comprising:
a means at a server for storing permission or denial for sending data from one optional terminal to another optional terminal;
a means at a voice input terminal at which voice is input for generating and sending voice data indicating said voice;
a means at said server for receiving said voice data;
a means at said server for sending said voice data to a voice receiving terminal to which data is permitted to be sent from said voice input terminal that sent said voice data;
a means at said voice receiving terminal to which data is permitted to be sent from said voice input terminal that sent said voice data for receiving said voice data; and
a means at said voice receiving terminal that received said voice data for outputting the voice indicated by said voice data.

23. A voice communications system according to claim 22, comprising:
a means at a predetermined terminal for designating permission or denial for sending data from said predetermined terminal to another optional terminal;
wherein said means for storing stores the designation.

24. A voice communications system according to claim 22, comprising:
a means at a predetermined terminal for designating permission or denial for sending data from one optional terminal to another optional terminal;
wherein said means for storing stores the designation if said designation is within the authorized limits of the predetermined terminal, or discards said designation if said designation is outside the authorized limits of the predetermined terminal.

25. A voice communications system according to claim 22, comprising:
a means at a predetermined terminal for designating permission or denial for sending data from one optional terminal to another optional terminal; and
a means at said predetermined terminal for sending said designation to said server if the designation is within the authorized limits of said predetermined terminal, or discarding said designation if the designation is outside the authorized limits of said predetermined terminal;
wherein said means for storing stores the designation sent by said predetermined terminal.

26. A voice communications method comprising:
a means at a server for storing permission or denial for sending data from one optional terminal to another optional terminal;
a means at a voice input terminal at which voice is input for generating and sending utterance data, which is shorter than a voice data indicating said voice and which is data indicating an utterance;
a means at said server for receiving said utterance data;
a means at said server for sending said utterance data to a voice receiving terminal to which data is permitted to be sent from said voice input terminal that sent said utterance data;
a means at said voice receiving terminal to which data is permitted to be sent from said voice input terminal that sent said utterance data for receiving said utterance data;
a means at said voice receiving terminal that received said utterance data for indicating the utterance by said voice input terminal that sent said utterance data;
a means at said voice input terminal that sent said utterance data for generating and sending said voice data;
a means at said server for receiving said voice data;
a means at said server for sending said voice data to said voice receiving terminal to which data is permitted to be sent from said voice input terminal that sent said voice data;
a means at said voice receiving terminal to which data is permitted to be sent from said voice input terminal that sent said voice data for receiving said voice data;
a means at the terminal that received said voice data for outputting the voice indicated by said voice data;
a means at said voice receiving terminal that received said voice data for generating and sending a reception result of said voice data;
a means at said voice input terminal from which data is permitted to be sent to the terminal that sent said reception result for receiving said reception result; and
a means at said voice input terminal that received said reception result for indicating a reception state of said voice data based on said reception result.

27. A computer-readable medium storing a program, which, when executed by a computer causes the computer to perform a method, the method comprising:
- generating voice data at a voice input terminal at which voice is input, the voice data indicating the voice;
- receiving the voice data at a server;
- sending the voice data from the server to a predetermined terminal;
- receiving the voice data at the predetermined terminal;
- outputting the voice indicated by the voice data at the predetermined terminal;
- generating a reception result of the voice data at the predetermined terminal;
- receiving the reception result at the voice input terminal; and
- visually indicating a reception state of the voice data based on the reception result at the voice input terminal.

28. The computer-readable medium according to claim 27, wherein the reception state is indicating by indicating an action of an avatar of a user of the terminal that received the voice data.

29. The computer-readable medium according to claim 27, wherein the reception result is an ACK message or a NACK message and indicating the reception state includes indicating that the voice data was correctly received if the ACK message was received within a predetermined period of time after a transmission of the voice data or indicating that the voice data was not correctly received if the NACK message was received within the predetermined period of time or if no message was received within the predetermined period of time.

30. The computer-readable medium according to claim 27, wherein generating the reception result includes adding an ID of the terminal that received the voice data to the reception result and indicating the reception state includes indicating the ID along with the reception state.

31. The computer-readable medium according to claim 27, wherein the reception result is based on a data form of the voice data.

32. A computer-readable medium storing a program, which, when executed by a computer causes the computer to perform a method, the method comprising:
- generating and sending utterance data from a voice input terminal, the utterance data shorter than a voice data indicating the voice and which is data indicating an utterance;
- receiving the utterance data at a server;
- sending the utterance data from the server to a predetermined terminal;
- receiving the utterance data at the predetermined terminal;
- indicating the utterance by the terminal that sent the utterance data at the predetermined terminal;
- generating the voice data at the terminal that sent the utterance data
- receiving the voice data at the server
- sending the voice data from the server to the predetermined terminal;
- receiving the voice data at the predetermined terminal; and
- outputting the voice indicated by the voice data at the predetermined terminal.

33. The computer-readable medium according to claim 32, wherein the process for indicating the utterance indicates the utterance by indicating an action of an avatar of a user of the terminal that sent the utterance data.

34. The computer-readable medium according to claim 32, wherein the server for processing the utterance data and the server for processing the voice data are different.

35. A computer-readable medium storing a program, which, when executed by a computer causes the computer to perform a method, the method comprising:
- storing, at a server, permission or denial for sending data from one optional terminal to another optional terminal;
- generating and sending voice data indicating the voice at a voice input terminal at which voice is input;
- receiving the voice data at the server;
- sending the voice data to a voice receiving terminal to which data is permitted to be sent from the voice input terminal that sent the voice data;
- receiving the voice data at the voice receiving terminal to which data is permitted to be sent from the voice input terminal that sent the voice data; and
- outputting the voice indicated by the voice data at the voice receiving terminal that received the voice data.

36. The computer-readable medium according to claim 35, wherein the method further comprises:
- sending data from a predetermined terminal for designating permission or denial to another optional terminal, wherein storing includes storing the designation.

37. The computer-readable medium according to claim 35, wherein the method further comprises:
- sending data from a predetermined terminal for designating permission or denial to another optional terminal, wherein storing includes storing the designation if the designation is within the authorized limits of the predetermined terminal, and discarding the designation if the designation is outside the authorized limits of the predetermined terminal, and wherein storing includes storing the designation.

38. The computer-readable medium according to claim 35, wherein the method further comprises:
- a process at a predetermined terminal for designating permission or denial for sending data from one optional terminal to another optional terminal; and
- a process at the predetermined terminal for sending the designation to the server if the designation is within the authorized limits of the predetermined terminal, or discarding the designation if the designation is outside the authorized limits of the predetermined terminal; wherein the process for storing stores the designation sent by the predetermined terminal.

39. A computer-readable medium storing a program, which, when executed by a computer causes the computer to perform a method, the method comprising:
- sending data from one optional terminal to another optional terminal via a server for storing permission or denial;
- generating and sending utterance data at a voice input terminal at which voice is input, the utterance data shorter than a voice data indicating the voice, the utterance data indicating an utterance;
- receiving the utterance data at the server;
- sending the utterance data to a voice receiving terminal to which data is permitted to be sent from the voice input terminal that sent the utterance data via the server;
- receiving the utterance data at the voice receiving terminal to which data is permitted to be sent from the voice input terminal that sent the utterance data;
- indicating the utterance at the voice receiving terminal that received the utterance data from the voice input terminal that sent the utterance data;

generating and sending the voice data at the voice input terminal that sent the utterance data;

receiving the voice data a process at the server;

sending the voice data to the voice receiving terminal to which data is permitted to be sent from the voice input terminal that sent the voice data via the server;

receiving the voice data at the voice receiving terminal to which data is permitted to be sent from the voice input terminal that sent the voice data;

outputting the voice indicated by the voice data at the terminal that received the voice data;

generating and sending a reception result of the voice data at the voice receiving terminal that received the voice data;

receiving the reception result at the voice input terminal from which data is permitted to be sent from the terminal that sent the reception result; and indicating a reception state of the voice data based on the reception result at the voice input terminal that received the reception result.

* * * * *